(12) United States Patent
Lim et al.

(10) Patent No.: US 9,372,939 B2
(45) Date of Patent: *Jun. 21, 2016

(54) INTERNET BASED SYSTEM AND APPARATUS FOR PAYING USERS TO VIEW CONTENT AND RECEIVING MICROPAYMENTS

(71) Applicant: Google Inc., Mountain View, CA (US)

(72) Inventors: Stanley T. Lim, San Jose, CA (US); John Galen Giddings, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/015,805

(22) Filed: Aug. 30, 2013

(65) Prior Publication Data

US 2014/0032540 A1 Jan. 30, 2014

Related U.S. Application Data

(63) Continuation of application No. 09/618,806, filed on Jul. 18, 2000, now Pat. No. 8,527,337.

(60) Provisional application No. 60/201,539, filed on Apr. 27, 2000, provisional application No. 60/151,512, filed on Aug. 30, 1999, provisional application No. 60/144,612, filed on Jul. 20, 1999.

(51) Int. Cl.
*G06Q 30/00* (2012.01)
*G06F 17/30* (2006.01)
(Continued)

(52) U.S. Cl.
CPC ...... *G06F 17/30964* (2013.01); *G06K 17/0032* (2013.01); *G06Q 10/0639* (2013.01); *G06Q 30/00* (2013.01); *G06Q 30/0235* (2013.01)

(58) Field of Classification Search
USPC ............... 705/14.35, 7.38, 7.39; 434/354
See application file for complete search history.

(56) References Cited

U.S. PATENT DOCUMENTS 5,724,521 A 3/1998 Dedrick
5,794,210 A 8/1998 Goldhaber et al.
(Continued)

FOREIGN PATENT DOCUMENTS

WO     WO 98/34189     8/1998

OTHER PUBLICATIONS

The Gale Group "Internet Access: ZurfRider Personal Internet Search Utility Reduces Search Time Up to 75%," Dec. 15, 1997.
(Continued)

*Primary Examiner* — Raquel Alvarez
(74) *Attorney, Agent, or Firm* — Fish & Richardson P.C.

(57) ABSTRACT

An Internet service is configured to provide information to a user of the service in ranked order according to demographic profile information about the user provided by the user. Such information might include advertising information and/or search results (e.g., rendered as hyperlinks) to search queries posed by the user. The information may be returned in a ranked order according to reward credits offered by advertisers and/or content providers associated with the advertising information and/or web sites represented by the search results. A process for verifying whether or not an Internet operation (e.g., sending an e-mail message or accessing a web site) is being attempted by a human being or an automated process may be incorporated with the service by using a quiz process that requires user interaction.

10 Claims, 20 Drawing Sheets

(51) Int. Cl.
  *G06K 17/00* (2006.01)
  *G06Q 10/06* (2012.01)
  *G06Q 30/02* (2012.01)

(56) References Cited

U.S. PATENT DOCUMENTS

| | | |
|---|---|---|
| 5,947,747 A | 9/1999 | Walker et al. |
| 6,009,410 A | 12/1999 | LeMole et al. |
| 6,078,866 A | 6/2000 | Buck et al. |
| 6,093,026 A | 7/2000 | Walker et al. |
| 6,195,698 B1 | 2/2001 | Lillibridge et al. |
| 6,269,361 B1 | 7/2001 | Davis et al. |
| 6,519,571 B1 | 2/2003 | Guheen et al. |
| 6,529,878 B2 | 3/2003 | De Rafael et al. |
| 2004/0039687 A1 | 2/2004 | Lent et al. |
| 2005/0149616 A1 | 7/2005 | Chapman |
| 2008/0052171 A1 | 2/2008 | Eldering |
| 2009/0125395 A1 | 5/2009 | Coleman |

OTHER PUBLICATIONS

"A Wall Street Rebound for Hypercom," Magazine/Journal, Trade; Dec. 1998, 3 pages.

von Ahn, et al., "Telling Humans and Computers Apart," Communications of the ACH, 2004, 47(2):57-60.

"Captcha" [online] [Retrieved on Aug. 9, 2005]; Retrieved from the Internet URL: http://en.wikipedia.org/wiki/Captcha; 4 pages.

User Attribute Configuration Page - Screenshot

| Attribute | User Values | Submit on Approval for Demographic Qualification | Submit on Approval for Demographic Research |
|---|---|---|---|
| Name | Stan Lim | ✓ | |
| Age | 30 | | ✓ |
| Gender | Male | ✓ | |
| Date of Birth | - | | |
| Zipcode | 95128 | | |
| Household Income | - | | |
| | | Submit  Cancel | |

| Advertiser Specific Bonus Page - Sample Screenshot ||||||
|---|---|---|---|---|---|---|
| Attribute | User Date Available ? | Demographic Bonus | Research Bonus | Share for Demographic Bonus? | Share for Research Bonus? | User Bonus |
| Name | ✓ | 200 | 200 | ✓ | ✓ | 400 |
| Age | ✓ | 100 | 100 | ✓ | ✓ | 0 |
| Gender | ✓ | 100 | 100 | ✓ | ✓ | 200 |
| Date of Birth | ??? | 500 | 500 | ✓ | ✓ | 0 |
| Zipcode | ✓ | 500 | 500 | ✓ | ✓ | 1000 |
| Household Income | ??? | 10000 | 10000 | ✓ | ✓ | 0 |
| Number of Cars | 5 | 5000 | 5000 | ✓ | ✓ | 10000 |
|  |  |  |  |  |  |  |
| Total Bonus |  |  |  |  |  | 11600 |

[Update] [Cancel]

Notes:
- All Attributes and Bonus Rewards are Defined by Advertiser
- If User Data is Available AND Shared, User Earns Bonus for that Attribute.
- Each User Bonus Item and Total Bonus is Calculated Automatically, or may Require Optional "UPDATE" Button
- ✓ Denotes Check Boxes that User can Check to Share Attribute and Earn Bonus.
- ??? Denotes Input Box that User Needs to Fill Out If User Wishes to Earn Bonus for that Attribute. In this Example, the "5" was Entered for "Number of Cars".

FIG. 3

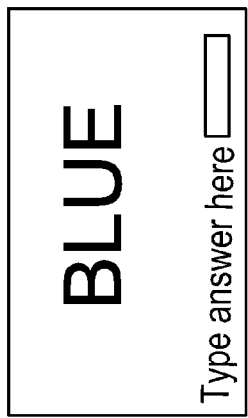
FIG. 4A
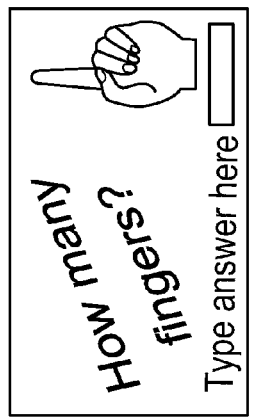
FIG. 4B
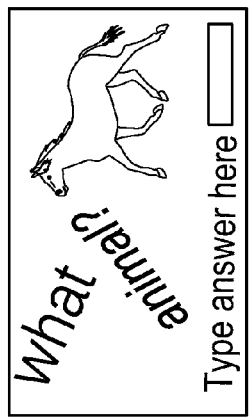
FIG. 4C
FIG. 4D
FIG. 4E
FIG. 4F

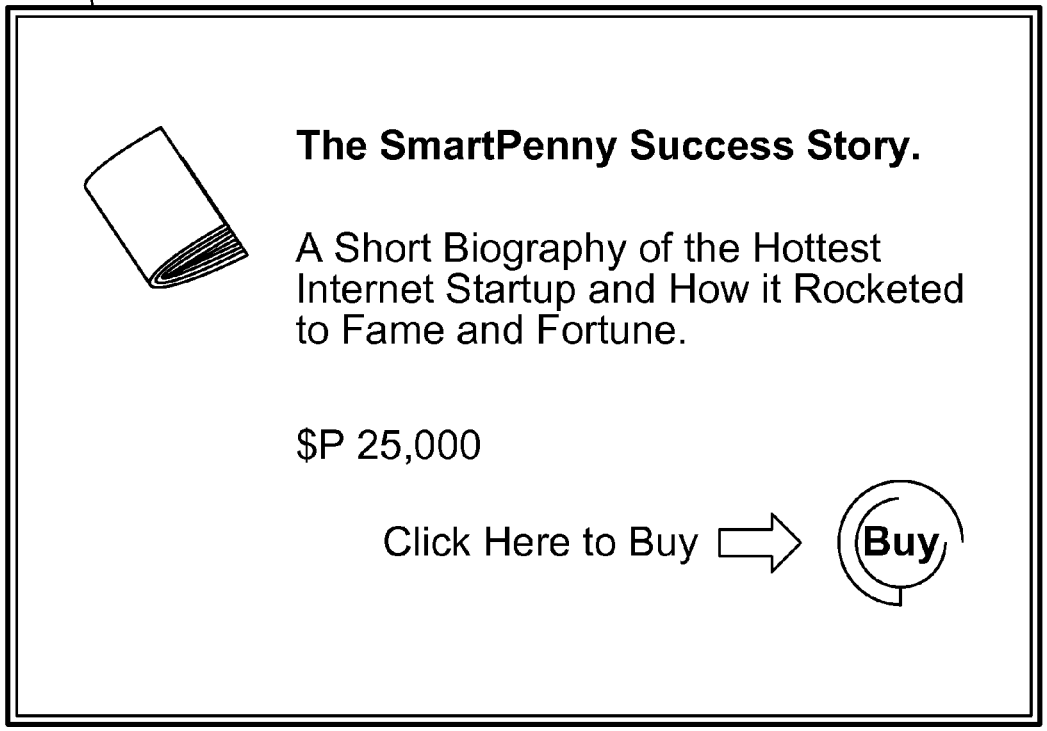
FIG. 7

Content Providers Can Politely Solicit Gratuity by Including the SmartTip Button to their Web Pages. An Example is Shown Below:

Click Here to Leave a Tip

I Hope You Enjoyed this Article. I Welcome Your Comments and Contributions. Thanks!

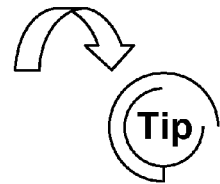

SmartTip Screenshots
This is Example of What the SmartTip Window May Look Like:

Enter Tip Amount $P  ─ 904

Please Enter Any Comments Here:

[Submit] [Cancel]   906

FIG. 9

Demographic Reward Matrix
1502

| Gender | Age | Six months of daily usage? (Due for vacation) | Show Banner? | Reward |
|---|---|---|---|---|
| MALE | Young | NO | NO | $ 1.50 |
| MALE | Young | YES | YES | $ 3.50 |
| MALE | Middle | NO | NO | $ 0.60 |
| MALE | Middle | YES | YES | $ 2.60 |
| MALE | Senior | NO | NO | $ 0.50 |
| MALE | Senior | YES | YES | $ 2.50 |
| MALE | None Given | NO | NO | $ 0.50 |
| MALE | None Given | YES | YES | $ 2.50 |
| FEMALE | Young | NO | NO | $ 1.10 |
| FEMALE | Young | YES | YES | $ 3.10 |
| FEMALE | Middle | NO | NO | $ 0.20 |
| FEMALE | Middle | YES | YES | $ 2.20 |
| FEMALE | Senior | NO | NO | $ 0.10 |
| FEMALE | Senior | YES | YES | $ 2.10 |
| FEMALE | None Given | NO | NO | $ 0.10 |
| FEMALE | None Given | YES | YES | $ 2.10 |
| None Given | Young | NO | NO | $ 1.00 |
| None Given | Young | YES | YES | $ 3.00 |
| None Given | Middle | NO | NO | $ 0.10 |
| None Given | Middle | YES | YES | $ 2.10 |
| None Given | Senior | NO | NO | $ - |
| None Given | Senior | YES | YES | $ 2.00 |
| None Given | None Given | NO | NO | $ - |
| None Given | None Given | YES | YES | $ 2.00 |

FIG. 15

Merchant Account Priority Bid Matrix
Enter your destination URL and the Desired bid for each consumer attribute.
The combination of your bid matrix and the customer's profile will create a unique search result list sorted by resulting bids. You have the option of passing a portion of your bid along to the consumer when the click to your site. Enter the percentage of the resulting bid you wish to pass on to your visiting customer in the percent field.

Pass Through Percent: ● 0%   ○ 25%   ○ 50%
URL: http://www.your
Returning Customer = "Yes"? $1.00
Keywords:
    Keyword1: $0.25
    Keyword2: $0.20

Gender:

Household Income:

$50,0
    $100,0

Age:

} 1802

Example:
Your_Company.com sets its bid levels to attract its target customers. With these settings, a new customer searching under "Keyword2" who is a 35 year old, married male, with two children and household Income of $75,000/year and has made purchases from your site in the past will trigger a bid of $2.20, 0% of which will be passed on to the customer when he clicks to Your_Company.com's site.

Marital Status:
    65+: $0.05
    Married: $0.10
    Single: $0.20

Children in Household:
    0: $0.00
    1: $0.10
    2+: $0.40

Merchants may elect to pass through a portion of their bid to the consumer to be more aggressive in attracting consumers to their site. Search results will be ranked based on the bid offered. Sites who offer a reward will have that reward listed next to their link.
Example:

Given a certain consumers demographic profile:

FIG. 18A

Amazon.com bids $1.50
Pets.com bids $1.10
SmallFry.com bids $0.50
CrazyEddy.com bids $1.00 and elects to pass 25% or $0.25 through to the visiting consumer Results display as:

| Site | Your reward for visiting |
|---|---|
| 1. Amazon.com | |
|     The best books online | |
| 2. Pets.com | |
|     The best pets online | |
| 3. CrazyEddy.com | $0.25 |
|     We're crazy! Try us! | |
| 4. SmallFry.com | |

We're small, but we try harder!

FIG. 18B

INTERNET BASED SYSTEM AND APPARATUS FOR PAYING USERS TO VIEW CONTENT AND RECEIVING MICROPAYMENTS

FIELD OF THE INVENTION

The present invention relates to the field of Internet search engines and, in particular, to a scheme that allows users of such search engines to receive individually generated search results based on user profiles and key words.

BACKGROUND

The term "search engine" is generally meant to refer to a server or a collection of servers dedicated to indexing Internet web pages, storing the results and returning lists of pages that match particular queries (e.g., key word queries). A server is a computer, program or process that responds to requests for information from a client. On the Internet, all web pages are held on servers. This includes those parts of the search engines and directories that are accessible from the Internet. The indexes themselves are normally generated using spiders. A spider is that part of a search engine that surfs the web, storing the universal resource locators (URLs, i.e., the web addresses) and indexing the keywords and text of each page it finds. At present, some of the major search engines are Altavista™, Excite™, Hotbot™, Infoseek™, Lycos™, Northern Light™ and Webcrawler™. Note that the popular site Yahoo™ is technically a directory (a server or a collection of servers dedicated to indexing Internet web pages and returning lists of pages which match particular queries—directories, also known as indexes, are normally compiled manually, by user submission, and often involve an editorial selection and/or categorization process), not a search engine. The term search engine is nevertheless often used to describe both directories and search engines.

Generally, search engines return results based on key words or search strings that are supplied by users. Results are typically found by matching the key words or search strings with metatags present in the hypertext markup language (HTML) used to encode the web pages of the target web sites. Results are also often ranked according to the quality of the match between the-metatags and the search strings. Depending upon the search algorithms employed by the search engine, the more frequently a terms is used as a metatag, the more likely it is to be assigned a high ranking in the returned results. Owners of web sites therefore often repeat metatag terms numerous times (often using common spelling variations and similar terms) so as to ensure that their respective web sites will gain a high ranking when an Internet user executes a search. While this is beneficial for the web site owner (as it is likely an Internet user will tend to select highly ranked results of a search), it is not necessarily beneficial for the user, who may be mislead into selecting a less than desirable web site by such tactics.

SUMMARY

In one embodiment, an Internet service is configured to provide information to a user of the service in ranked order according to demographic profile information about the user provided by the user. Such information might include advertising information and/or search results (e.g., rendered as hyperlinks) to search queries posed by the user.

The information may be returned in a ranked order according to reward credits offered by advertisers and/or content providers associated with the advertising information and/or web sites represented by the search results. An advertiser controlled portion of such reward credits may be posted to an account maintained by the user upon selection by the user of cursor-selectable objects (e.g., icons, banner ads, hyperlinks, radio buttons, check boxes, etc.) associated with the advertising information and/or search results. The remaining portion of the credit may be paid to the hosting service. Ultimately, the reward credits may be redeemed through the Internet service for cash, Internet content or other value.

In another embodiment, a process for verifying whether or not an Internet operation (e.g., sending an e-mail message or accessing a web site) is being attempted by a human being or an automated process may be implemented by using a quiz process that requires user interaction. The quiz process may include causing a graphical image which includes a question contained therein or associated therewith to be transmitted. The quiz process may be used in conjunction with an Internet service configured provide information (e.g., advertisements or search results) to a user of the service in ranked order according to demographic profile information about the user provided by the user. The information is preferably returned in a ranked order according to reward credits offered by advertisers and/or content providers associated with the advertising information and/or web sites represented by the search results.

In still another embodiment, an Internet service is configured to display advertisements and/or search results in a ranked order according to available reward credits offered in exchange for user demographic profile information. The demographic profile information may be provided to an advertiser and/or content provider upon user selection of a cursor-selectable object associated with a corresponding advertisement and/or web site. Also, upon selection of the cursor selectable object, a user account may be credited with the associated reward credits. The value of the available reward credits may be controlled per time period and/or per user interaction and may be redeemed for Internet content, as part of a sweepstakes, in exchange for content consumption and/or used as gratuities for content providers.

The available reward credits may be displayed as base credits offered for basic demographic profile information and extra credits for detailed demographic profile information. Further, quizzes, such as those described above, may be used to differentiate between human users and automated computer processes. The quizzes may be used at a frequency according to a past history of successful responses to such quizzes.

DESCRIPTION OF DRAWINGS

The present invention is illustrated by way of example, and not limitation, in the figures of the accompanying drawings in which like reference numerals refer to similar elements and in which:

FIG. 2 illustrates a user configuration matrix that may be completed by a user during a registration process in accordance with an embodiment of the present invention.

FIG. 3 illustrates an example of a user profile matrix that may be displayed to a user in accordance with an embodiment of the present invention and which shows available reward points and configuration options associated with various user profile information.

FIGS. 4A-4F illustrate various types of quizzes, any of which may be used in combination with one another or individually, which may be included in embodiments of the present invention.

FIG. 7 illustrates examples of how the price of certain content may be listed next to links associated therewith in accordance with an embodiment of the present invention.

FIG. 9 illustrates examples of user interface features that may be associated with gratuity sites in accordance with embodiments of the present invention.

FIG. 15 illustrates an example of a demographic reward matrix in accordance with an embodiment of the present invention.

FIGS. 18A and 18B illustrates an example of a reward matrix that may be used in accordance with an embodiment of the present invention.

DETAILED DESCRIPTION

Figure 1:
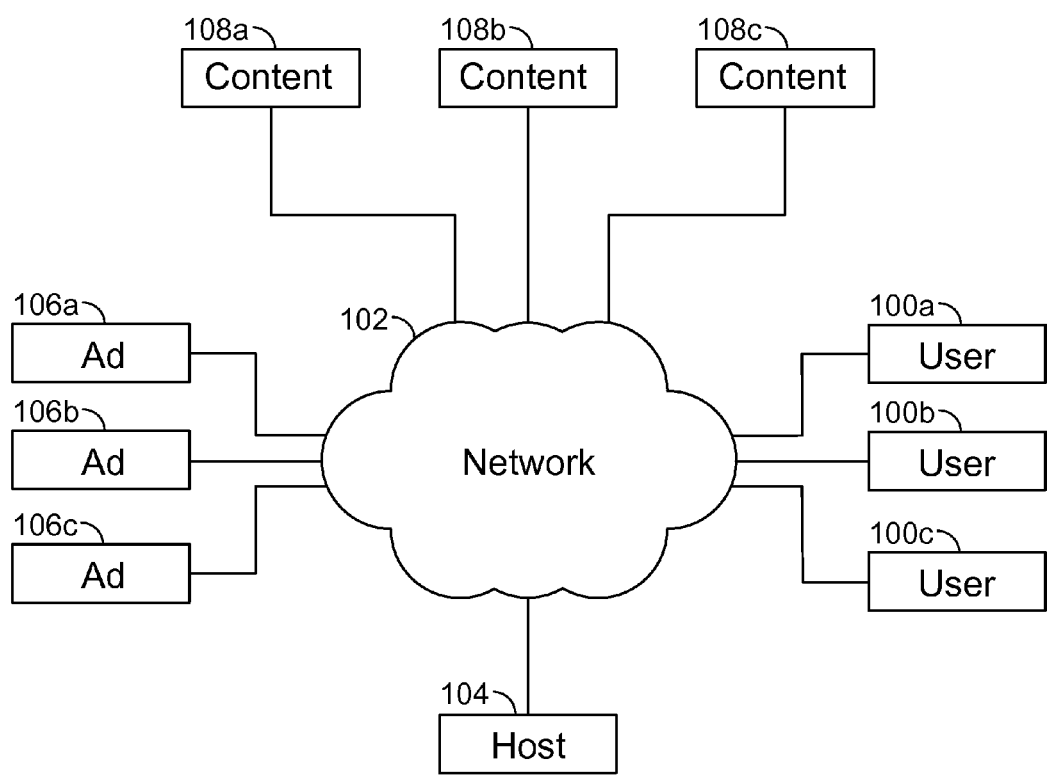
FIG. 1 illustrates a network architecture within which embodiments of the present invention may operate and be utilized.

A scheme that allows Internet users to take advantage of their individual user profiles in retrieving search results, viewing advertisements and/or performing other Internet-related activities is disclosed herein. Some embodiments of the present invention allow users to earn money, or credits, on-line by visiting certain web sites and/or viewing advertising on particular web sites. Such credits can be redeemed at content sites accessible via the Internet, exchanged for merchant gift certificates or airline miles, used as entries in sweepstakes and contests, used as payment for credit card balances, withdrawn as cash, and/or used as gratuities for the content providers. Furthermore, the system may allow users to use standard Web browsers such as Netscape's Navigator™, available from Netscape Communications, Inc., Mountain View, Calif., or Microsoft's Internet Explorer™, available from Microsoft Corporation, Redmond, Wash., and still access the features provided by the various embodiments of the invention.

In accordance with embodiments of the present invention, web site owners and/or advertisers can target their most desired audiences by setting higher rewards for specific demographic characteristics and thus "qualify" visitors to their site and/or viewers of their advertising. Further, advertisers can better control web-based advertising costs as demographically targeted advertising. The architecture of the system also allows content providers to assess micro-payments, e.g., small payments that may be less than $1.00 per item, for their content or provide a means for users of their web sites to leave them gratuities.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying", "rendering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although discussed with reference to certain illustrated embodiments, upon review of this specification, those of ordinary skill in the art will recognize that the present methods and apparatus may find application in a variety of systems. Therefore, in the following description the illustrated embodiments should be regarded as exemplary only and should not be deemed to be limiting in scope.

Before describing various aspects of the present invention in detail, it is helpful to present some background relating to the Internet in as much as it is expected that several embodiments of the present invention will make use of and be deployed over this ever-expanding network of computer networks.

At bottom, the Internet may be regarded as a collection of devices linked together by various telecommunications media, enabling these devices (e.g., computer systems and the like) to exchange and share data, multimedia content and other information. Content sites accessible through the Internet provide information about a myriad of corporations and products, as well as educational, research and entertainment information and services. Literally millions people worldwide use the Internet on a daily or weekly basis.

A computer or resource that is attached to the Internet is often referred to as a "host." Examples of such resources include conventional computer systems that are made up of one or more processors, associated memory (typically volatile and non-volatile) and other storage devices and peripherals that allow for connection to the Internet or other networks (e.g., modems, network interfaces and the like). The precise hardware configuration of the hosting resource is generally not critical to the present invention, nor are the precise algorithms used to implement the services and methods described herein. Instead, the focus is on the nature of the services provided by the hosting resource.

In most cases, the hosting resource may be embodied as hardware and/or software components of a server or other computer system that includes an interface module, which allows for some dialog with a user, and that may process information through the submission of Web forms completed by the user. Generally, such a server will be accessed through the Internet (e.g., via Web browsers) in the conventional fashion. Operating in conjunction with the interface module may be a communication interface that supports the distribution of electronic mail (e-mail) messages to or from other Web sites or users.

In order to facilitate communications between hosts, each host has a numerical Internet protocol (IP) address. The IP address is made up of four groups of numbers separated by decimals. For example, the IP address of a hypothetical host computer might be 123.124.78.91. Each host also has a unique "fully qualified domain name." The "fully qualified domain name" may not be repeated in the Internet. In the case of the hypothetical host 123.456.78.91, the "fully qualified domain name" might be "computer.domain.com".

In its most generic form, a fully qualified domain name consists of three elements. Taking "computer.host.com" as an example, the three elements are the hostname ("computer"), a domain name ("domain") and a top-level domain ("com"). A given host looks up the IP addresses of other hosts on the Internet through a system known as domain name service.

Domain name service is accomplished as follows: The Internet is divided into several "top level" domains. For example, ".edu" is a domain reserved for educational institutions, ".gov" is a domain reserved for government entities and ".net" is generally reserved for enterprises operating within the Internet. Although ".com" is short for "commercial," it is a catchall domain and is today the most popular one generally available to Internet users that have no special attributes, i.e., those that are not a school, a government office or an Internet-based enterprise. Each domain name active in a given top-level domain is registered with the top-level server which contains certain hostname and IP address information.

As previously indicated, in order to access the Internet most users rely on computer programs known as "Web browsers." Commercially available Web browsers include such well-known programs as Netscape's Navigator™ and Microsoft's Internet Explorer™. If an Internet user desires to establish a connection with a Web page hosted at computer.domain.com, the Internet user might enter into a Web browser program the uniform resource locator (URL) "http: www.domain.com". The first element of the URL is a transfer protocol (most commonly, "http" standing for hypertext transfer protocol, but others include "mailto" for electronic mail, "ftp" for file transfer protocol, and "nntp" for network news transfer protocol). The remaining elements of this URL (in this case, "www" standing for World Wide Web—the Internet's graphical user interface—and "domain.com") are an alias for the fully qualified domain name of the host computer.domain.com. Once a URL is entered into the browser, the corresponding IP address is looked up in a process facilitated by a top-level server. In other words, all queries for addresses are routed to certain computers, the so-called top-level servers. The top-level server matches the domain name to an IP address of a domain name server capable of directing the inquiry to the computer hosting the Web page. Thus, domain name service ultimately matches an alphanumeric name such as www.domain.com with its numeric IP address 123.456.78.91. Registration of domain names is currently handled by a variety of organizations.

A domain name server is a host computer with software capable of responding to domain name inquiries and accessible on a full-time basis to other computers on the Internet. Registering a domain name is the step that allows the top-level servers within the Internet to know where the domain name servers or hosts associated with those domain names are located in the Internet. Domain name service can be operated by the domain name holder or obtained from any entity with the proper computer equipment, including hundreds of Internet service providers (ISPs).

One way to establish a presence on the Internet is by placing a Web page, which is, ultimately, a computer data file on a host operating a Web server within a given domain name. When the Web server receives an inquiry from the Internet, it returns the Web page data in the file to the computer making the inquiry. The Web page may be a single line or multiple pages of information and may include any message, name, word, sound or picture, or combination of such elements. Most Web browsers will show somewhere on the screen the domain name of the Web page being shown and will automatically include the domain name in any printout of the Web page. There is no technical connection or relationship between a domain name and the contents of the corresponding Web page.

There are a number of ways for an Internet user to find a Web page. Web browsers feature access to various indexes, commonly referred to as search engines. These indexes will allow the user to enter a name or a word or a combination of words, and will return the results of the search as a list of "hyperlinks" to Web pages that have information within or associated with the document making up the page responding to the search.

A hyperlink is a link from one site on the Internet to a second site on the Internet. "Clicking" (or, more generally, selecting using a cursor control device such as a mouse, joystick, touch pad, etc.) on a designated space on the initial site which references the subsequent site by a picture, highlighted text or some other indication will direct the user's browser from the initial site to the second site. In addition to their use in indexes, hyperlinks are commonly placed on Web pages, thus allowing Internet users to move from Web page to Web page at the click of a button, without having to type in URLs. Hyperlinks are also used to initiate the transfer of files or other information from the hosting resource to the user's computer in a process commonly known as downloading.

Hyperlinks can be and commonly are established without reference to the domain name of the second site. A hyperlink is not technically related to a domain name and therefore it can be identical to an existing domain name without conflicting with that domain name. For example, were the operator of a Web page known as SITE to establish a home page at http: www.xyz.com, any number of indexes could be employed and hyperlinks could be established to bring up the page through use of the word SITE.

Some Web pages are referred to as Web forms. In general, a form is a collection of form fields displayed as a Web page by a browser in response to hypertext mark-up language (HTML) tags and other information received from a Web server. An associated form handler resides at the server to collect and process the information submitted by a user via the form. By using such forms, an information collection process performed by a host is made interactive with the users thereof. That is, users can add text to text boxes, select from drop down menus and/or select check boxes and/or radio buttons, etc. Typically, the user submits the form by clicking on a submit button or other appropriately labeled element of the form and, upon such submission, the contents of the form are passed to the form handler. Depending upon the type of information being submitted and the type of form handler being used, the information submitted by a user may be appended to a file maintained by the host, for example a file associated with a temporary account assigned to the user or a larger database. In this way information may be collected, processed and displayed to those who access it.

A text box is a standard form field into which a user can type text. When a form containing a text box is submitted in a Web browser, the name and contents of the text box are provided to the form handler running on the server. A check box field is typically arranged in a grid or matrix fashion with one or more cells of the matrix including a check box. Check box fields present a user with choices that can be made by clicking (e.g., selecting or deselecting as appropriate) a check box. Such fields are created and rendered using programming techniques common in the art and any number (including all or none) of individual check boxes may be selected or not. When a user submits a form containing a check box field, the name of each check box along with its value is provided to the form handler at the host. Radio button fields present a user with a choice that can be made by selecting a button. Radio buttons are displayed in a set, only one of which may be selected at a time. When radio button fields are created, they are assigned a group name, and each button in the group is assigned a value and an initial state (selected or not selected). When the user selects one of the buttons in the field, all other buttons in the field take on a value of not selected. Then, when the user submits the form, the group name and value of the buttons is provided to the corresponding form handler at the server for processing.

With the above background, aspects of the present invention may now be described. In general, the present invention may be regarded as a service that allows users (preferably registered users) thereof to earn and/or redeem credits on-line in exchange for sharing their personal or demographic information. Thus, users of the system (which may be regarded as a hosted environment embodied as computer readable instructions residing in computer-readable media associated with a computer system attached to/accessible through the Internet) are asked to provide demographic information which may be used to customize advertisements displayed to the user and/or search results from search queries posed by the user. In exchange for this information, the users receive credits which they can later redeem in various fashions as described below. To the users, the process is very similar to the customary actions they may be accustomed to in interacting with other search engine sites and/or web portals, with the exception that the use of rich demographic profiles allows for certain customizations that are not provided by other Internet-based services and systems. In addition, the present system offers unique features such as "quizzes" which can be used to validate a third party. These and other features will be discussed below.

A. System Architecture

A basic system architecture within which embodiments of the present invention may operate and be utilized is shown in FIG. 1. Users 100*a-c* are coupled in communication with a network 102. The network 102 might be the Internet, or some other type of computer network (e.g., a local or wide area network or a metropolitan area network) or network of networks. Through the network 102, the users 100*a-c* can access content sources 108*a-c*. For example, the content sources 108*a-c* might include servers and/or proxies hosting Web sites for entertainment, commercial enterprises, research journals, newspapers, and/or some other type of activity, business or interest. Advertisers, such as advertisers 106*a-c*, are entities that wish to place advertising and/or draw visitors to their sites. Some of the advertisers 106*a-c* may also be content providers. For example, a company such as Netscape™ might both advertise its portal service as well as provide content.

Host 104 is configured in accordance with an embodiment of the present invention and may also support the transaction or micro-payment system described below. As part of its operation, host 104 stores information about user accounts, e.g., for the users 100*a-c*. Host 104 may also provide advertisers 106*a-c* means to receive payment for qualified viewers, e.g., those meeting certain pre-established demographic criteria. Also, the host 104 may provide content providers means to receive payments for goods and services they offer either through a "pay-per-view" fee or a tipping (gratuity) scheme. For example, a content provider associated with content source 108*a* might offer access to a scientific journal hosted at that content source at for $0.50/article (or some other pay-per-use fee). Alternatively, the content provider might provide a hyperlink to a Web site (e.g., hosted by host 104) that allows users to provide a gratuity (e.g., so as to express their appreciation for a particular story or column). Thus, the host 104 acts as a transaction mediator for this system. The host 104 may be made up of one or more computers, a cluster of computers, a web or server farm, and/or some other configuration of one or more computers.

The remainder of the discussion below will assume that the network configuration shown in FIG. 1 is used. Accordingly, embodiments of the invention (which may be computer software, hardware and/or combinations of both) are discussed as being hosted/provided by or from the host 104, although advertising content and hyperlinks to other reward-offering sites may be provided by other sources. In some cases the network 102 may be associated with multiple hosts 104 supporting embodiments of the invention. Depending on contractual arrangements between providers, credits earned on one system may or may not be valid on another. Aspects of the present invention will be described according to several systems and features as follows. Initially, user interface portions of the system will be described including process for registering with the hosting provider; searching for relevant websites, URLs or links; reading ads; tipping; bonuses; and other user portions. Subsequently, portions of the advertiser systems and features will be described; followed by a discussion of content provider systems and features.

B. User Systems and Features

Some embodiments of the present system offer a number of different features to support users thereof. The customer registration process will be described first, and then the ad viewing and searching processes will be described. Next, several additional features of the present system, such as merchant feedback and quality control processes, sweepstakes events, trading posts, the tipping process, the content consumption process and the bonus process will be described.

1. New User Registration and Log-In

In some embodiments of the present invention, a search engine returns results according to a ranking that is established according to user-supplied demographic information. In these and/or other cases, advertisements may be presented to users based on such demographic information. Accordingly, embodiments of the present invention offer user registration processes so that users might build rich profiles of themselves, allowing for customized search results to be returned by the search engine each time a search query is executed and/or to provide customized advertisement viewing. To enhance such features, embodiments of this scheme allow users to "sign up" (i.e., register and create a profile) quickly and easily (e.g., by completing one or more Web forms or similar data entry/collection devices). Some embodiments of the present scheme only require that a user select a username and a password (as is common in the Internet environment). This allows the registration process to be completed very quickly. Further, users that have registered via this quick start procedure can return at a later time to provide a more detailed registration profile and thus take advantage of the demographically-targeted search/ad presentation processes described herein. In some embodiments, users may be encouraged to provide these rich profiles by the promise of earning rewards (see below), among other features.

The basic registration process may be described as follows:

A. New users may by referred to a service provider's Web site (e.g., hosted by host 104) offering a service configured in accordance with the present invention and encouraged to "sign up", e.g., by information displayed at a content provider's Web site, various advertising for the service, the service provider's home page, and/or some other source.

i) Before being allowed to register, these new users may be asked to answer one or more questions of a quiz to test whether they are a human users or not (see the discussion of such Quizzes below). As indicated above, spiders are automated computer processes that are capable of searching the Web and retrieving Web page information. Variations of spiders known as robots or bots have been created that might allow for completion of a simple web form or other registration instrument, and thereby garner any rewards associated therewith, without having to subject a human user to this process. To avoid abuses of the present system, quizzes may be introduced at various levels to thwart such automated processes and allow access only by live, human users.

B. When the new user arrives at a Web site associated with the present service, basic registration information is requested, such as a username and a password. This form of registration process is commonly used in the Internet environment to track users and allow for personalization of content to be displayed when the user returns to the subject Web site. In addition, the user may be invited to complete a more detailed registration card (really a Web form) that solicits more personal information about the user. In this way, the hosting service can build a rich user profile that will be useful when the user executes searches using a search engine associated with the present service and/or in determining which advertisements to present to the user.

i) Some embodiments of the present invention may include one or more sponsor advertisements in a registration window (e.g., a pop-up window that is rendered by the user's browser upon his or her first visit to the subject Web site). This advertisement may be associated with a service that rewards the new user for viewing the advertisement, and may also offer additional rewards for selecting (e.g., clicking through) on the advertisement, which may be rendered as a banner ad as is common in the art.

ii) Some embodiments of the present invention allow a new user to earn additional credits or rewards by answering basic profile questions. As indicated above, answers to these profile questions may be used to build rich profiles that may be provided (perhaps for a fee) to third parties (e.g., advertisers) and/or used to provide customized responses to search queries.

iii) Some embodiments of the present invention may allow a user to state a preference for viewing hyperlinks as URLs, text links, expanded text links or graphical banners. Responses to such inquiries may be used to further customize any returned search results.

iv) In addition to usernames, passwords (or other personal identifier(s)) and demographic questions, a user may be provided with the ability to share certain elements of his/her system usage history to earn greater rewards. For example, the operator of a Web site devoted to travel may predict that a user who has had account activity every day for the past six months has not had a vacation in that time and subsequently choose to target such users aggressively. For those users that have opted to share such usage history, the travel site operator may provide generous rewards in exchange for this information. Users can selectively choose to provide such information, knowing that as a result they will be sharing what some might consider to be very personal information about their on-line habits. The benefit of sharing this information is the prospect of more appropriately targeted search results and/or greater rewards from merchants interested in such data.

a. The user may selectively offer to share elements of their on-line activity, for example, sharing that activity has occurred, but not the specifics of the activity; or sharing the knowledge that the user has earned rewards, but not disclosing the specific sites from which they were earned.

v) Some embodiments of the present invention may involve sending (e.g., by e-mail or surface mail or other delivery mechanism) a password to the new user. Similar to the quiz arrangement described herein, providing a password in this manner tends to ensure that only a live person (and not an automated computer process) will be able to respond correctly. For example, a message to the user indicating that, "Your password is the word that (is not an animal, or does not have a # in it) or is presented in a graphic" might be sent via e-mail in response to the user completing the registration process. If a user's e-mail viewer is not HTML-enabled (and so may be incapable of rendering an image), an alternative link a web site at which the image (in the case where the password is identified in an image as opposed to simply a text message) can be viewed may be offered.

vi) Some embodiments of the present invention may involve automatically conveying additional information about the user, once the user has opted in, such as geographic location, local time, local current weather and/or the current activity of the user based on their electronic calendar (working, on vacation, off work, etc.).

vii) Some embodiments of the present system may involve discovering, with the user's permission, what commerce sites that user has been a customer of.

viii) Some embodiments of the present system may involve asking the user which site they came/were referred from and which Internet site is their favorite.

ix) After creating the new user's account, a cookie may be placed on the user's computer system with the user's account information to enable automatic login for future sessions. A cookie is a general mechanism that server-side connections (such as common gateway interface scripts) can use to both store and retrieve information on the client-side of the connection. The addition of such a simple, persistent, client-side state significantly extends the capabilities of Web-based client/server applications.

x) Some embodiments of the present system may involve asking the user for their business demographic profile attributes such as the size of the user's company, nature of that business, its industry, the user's position/title in the company, his/her purchase authority, his/her business contact information, etc.

C. Depending on where the user was referred from the user may, at the conclusion of the registration process, be directed to an appropriate location (e.g., returned to the referring site or to another site related thereto). For example, if the user was referred from a content site, he/she may be redirected back to that site. Alternatively, the user might be presented with an ad browser to allow the user to view more advertisements and/or Web sites at which he/she can earn/redeem credits.

2. Registered Users Logging-In

When a registered user arrives at a Web site offering the present service, the system checks for the presence of a cookie such as that described above. If a cookie is present, the user may be automatically logged on; although, the user's password may be requested to verify his/her identity. If a cookie is not present, the user is asked to log in. The registration cookie can be a permanent cookie or session cookie according to the user's preferences. Such log in practices for registered users are customary in the Internet services arts and need not be described further herein.

Once a user logs in and/or when the user visits his/her account balance page, the user may be shown his/her current account balance (e.g., in terms of accumulated credits) either in a pop up window or in a fixed position of one or more Web pages. Such information may be rendered using active server page and/or Java™ technology common in the Internet arts. The login page may also provide the ability to allow a new user to log in and replace a previous user on the system.

3. Follow-Up Registrations

Registered users can return to their account at their convenience and update their profile information to reflect current information about the user and/or to provide additional information for which the user might receive higher bonus rewards and/or to update the user's contact information.

A. Users can complete each field of a web form to fill out their demographic profile by one or more of the following processes:

i) Entering/selecting a field of the web form and accepting a default option of always sharing the specified information for demographic rewards and/or transferring the field value to an advertiser. Such items/values will always be submitted and the bonuses associated with the submission of such information will be received automatically. For example, a user may always want to reveal that he/she lives in a particular city and collect rewards associated with the release of that information.

ii) Entering requested information in a field of the web form and selecting a "submit on approval" option. By selecting this option, the user can decide on a case-by-case basis whether he or she wants to share the associated information for demographic targeting or the actual value of their profile. For example, a user may be willing to reveal that he/she lives in a group of zip codes (or even his/her actual zip code) to some web site operators/advertisers, but not to others.

iii) Leaving a field blank. For example, a user may never want to share information such as his/her e-mail or physical address.

B. Users can customize their automatic registration process by setting their local cookie duration to permanent, timed, or per session, as is common in the Internet arts.

C. Users can add to their account balance by attaching a credit or debit card to their account. That is, users may be permitted to add on-line credits by purchasing them using a credit or debit card. This allows users to make on-line purchases of goods, services or information without having to earn the credits by using other features of the rewards scheme described herein.

D. User account balances may be withdrawn. That is, credits earned on-line may be exchanged for monetary credit in the form of a check or credit posted to a credit card, etc. In some cases, credit may be issued by direct deposit to a user's bank account or other account (e.g., a money market fund or other account). If appropriate, time restrictions, amount restrictions, and/or a service fee may be charged for this service (e.g., the withdrawals may be limited to a certain monthly amount).

E. User account balances may be capped to encourage online spending. The cap may be increased on a per-user basis, based on that user's usage of their account over time. For example, a cap of $20 (or the equivalent number of on-line credits if credits are measured in units other than dollars) might be set, however a particular user might have a higher cap of, say $100 or some other amount, based on his/her past (frequent) usage. Caps may also be reduced, if appropriate.

Figure 14:
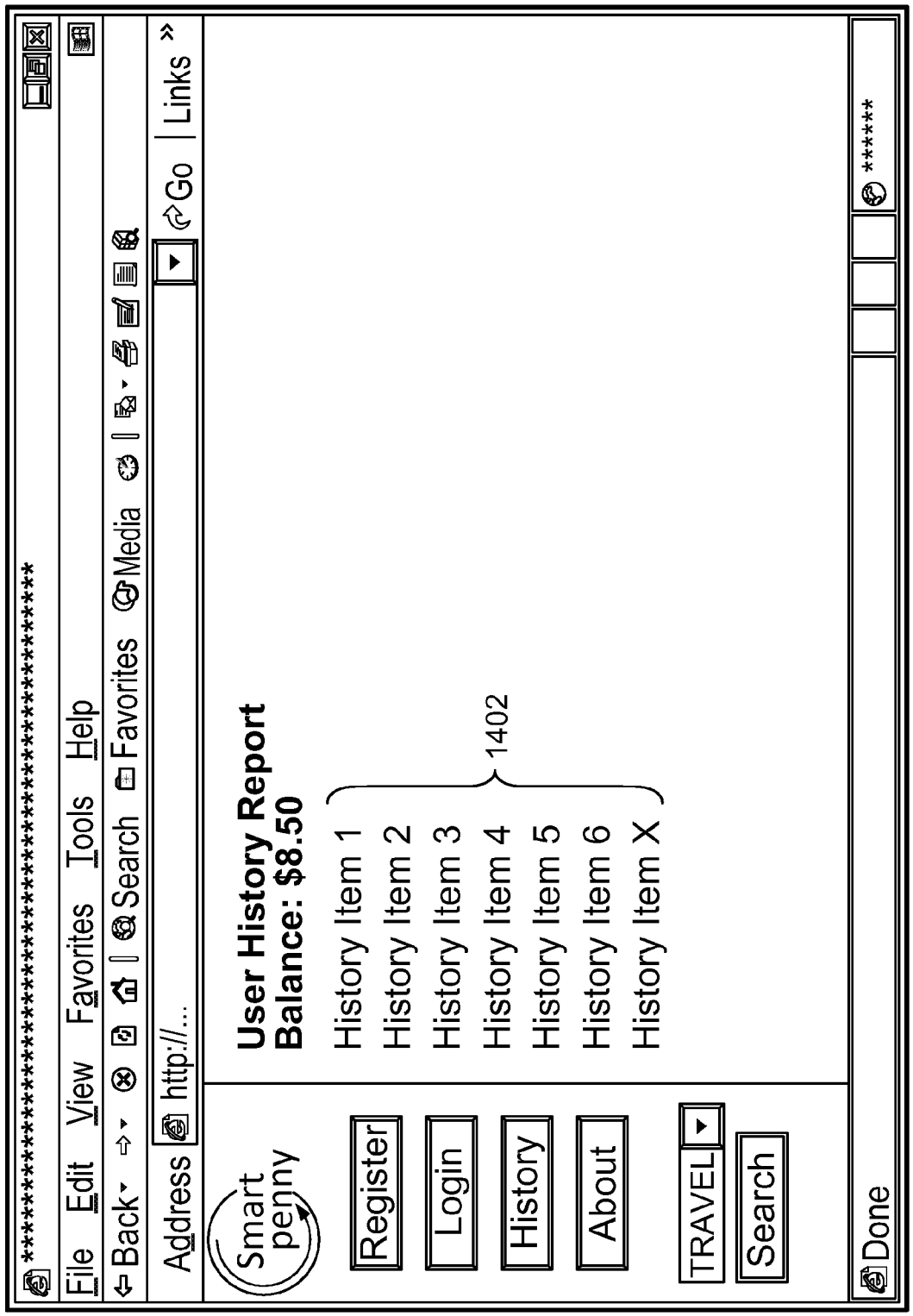
FIG. 14 illustrates an example of a user history report in accordance with an embodiment of the present invention.

F. Users can view their account balance and history. For each transaction, the content provider or advertiser Web site, transaction amount, time, resulting balance and/or other desired fields might be shown. (See, e.g., FIG. 14, which shows an example of a user history report 1402.)

G. Users may be permitted to access tools to evaluate site activity with respect to demographics, activity over time, responses to price changes and discounts.

4. Constraints on Automated Usage

Computer systems configured in accordance with the present invention may limit or restrict the number of users which are allowed access from a particular computer or terminal based upon a certain number of cookies or Java applets installed on the user's computer or terminal. Such systems may also constrain automated access by allowing a limited number of users access from computers or other web-capable devices associated with certain unique identifiers such as a medium access control (MAC) addresses, IP addresses, or central processing unit (CPU) serial numbers.

5. Quizzes

Quizzes may be used as part of a process to verify that a user is a human, as opposed to an automated process (e.g., a bot or robot). Because users are paid per ad and/or site viewed, an automated system would be able to earn money or credits without the desired human actually viewing the advertising or visiting the site. Accordingly, some embodiments of the present invention make use of periodic quizzes, also called a SmartQuiz™, to verify that a particular user is a human. As noted above, these quizzes may be employed during the registration process to verify that a user is a human. Additionally, such quizzes can be used in conjunction with follow up registrations, and/or between transactions using some embodiments of the invention.

The basic premise is to design a quiz (or question) using a display format that cannot be easily recognized or read by a machine or automated process. For example, text that is embedded in graphical representations such as an image could be used. The pictures can contain a simple question that any user would be expected to be able to answer. For example, the picture or other image form might have the text "123" drawn therein, and the quiz question might read, "What number is shown?" A separate text box or other data entry device rendered in the web page with the quiz question image could then be used by the user to enter his/her answer.

Because automated entities are not able to decipher the question (or more particularly, the answer to the question) from the image, such processes will not be able to respond correctly to the question. In contrast, because of the intentionally simple nature of the questions, almost any human could provide the correct answer. The object here is not to test the skill or knowledge of the user per se (although such tests could be used if appropriate to a given situation), but rather to ensure that some human being (and not just another computer system) is actually viewing the pages/ads being rendered. This way, advertisers are provided with some assurance that their advertising dollars are not being wasted.

The answers to the quiz questions may be provided using a text-input box located anywhere on the Web page containing the quiz image. For multiple-choice questions, the answers might be selectable from the image itself, e.g., using an image map, and/or through an HTML form surrounding the picture.

FIGS. 4A-4F illustrate various types of quizzes, any of which may be used in combination with one another or individually:

i) Number recognition (e.g., FIG. 4E). A number is presented graphically. The number can be generated randomly or from tables.

ii) Simple word/object identification/recognition (e.g., FIGS. 4C and 4F). The name of an object or other word is spelled out in graphical text or a picture of an easily recognizable object is displayed, for example a dog, a book, a car, the word "Ice Cream", etc. Users are asked to enter (e.g., in a text box) the name of the object in the space provided, or, are asked to select the correct picture or word matching the object displayed. Users may also be asked to identify the one object that does not belong in a set of objects being displayed. Other recognition examples include:

(1) Twisted text recognition (e.g., FIGS. 4A and 4B). A simple question is presented in text that is twisted (i.e., displayed in a non-linear fashion) to make optical character recognition (OCR) difficult, while still remaining easily readable to a human.

(2) Color recognition (e.g., FIG. 4D). A color is presented and the user is asked to identify it.

(3) Shape recognition (e.g., FIG. 4C). A user is asked to identify the shape presented (e.g., a triangle, a square, etc.).

(4) Self-answering questions (e.g., FIGS. 4A, 4E, and 4F). Text or graphical questions that contain their own answer.

Figure 17:
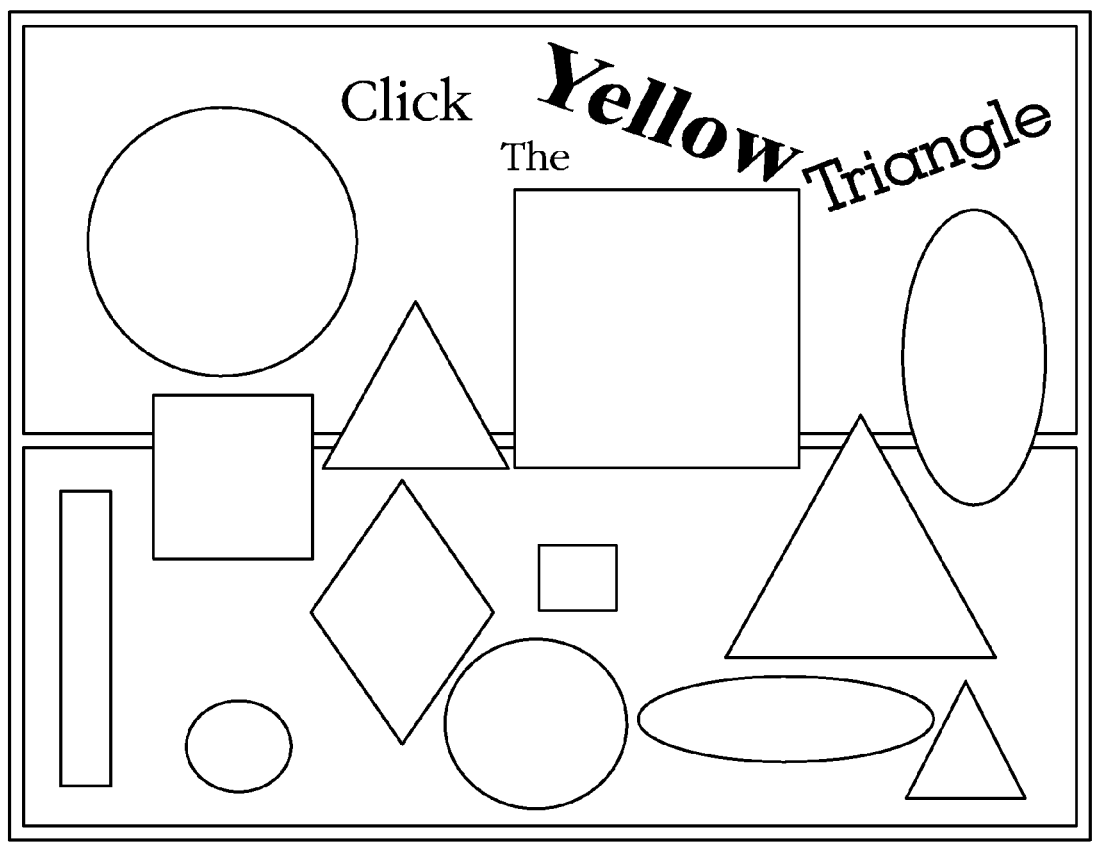
FIG. 17 illustrates a further example of a quiz, which may be used in combination with other quizzes or individually, and which may be included in embodiments of the present invention.

(5) Short question, short answer (e.g., FIGS. 4A, 4B, 4C, 4E, and 4F). The user simply types the word presented in the image.

iii) Simple counting (e.g., FIG. 4E). A number of similar object are displayed, such as 2 balls, 4 birds, 1 finger, etc. Users are asked to enter (e.g., in a text box) the number of objects being displayed, or are asked to select the picture, word or number matching the object displayed. Users may also be asked to select the set of pictures showing the same number of objects.

iv) Simple computations. Using numbers or objects or a text description, users are asked to perform simple calculations such as 1+1, 2*2, "4 divided by two", "XXXX minus XX" (where X is an integer, etc.). Users are asked to enter (e.g., in a text box) the correct answer to the mathematical expression, or are asked to select the correct answer represented in a picture, word or number. Users may also be asked to select the set of pictures showing the same mathematical results. For example, the question may display "2 cats+2 dogs" and the correct answer may be "2 cats+2 dogs".

v) Simple queries (e.g., FIGS. 4A-4F). Users are asked simple questions using graphical text. Responses may be entered as text or selected by "clicking" (e.g., using a cursor control device such as a mouse) on the right area. Examples of questions that might be used are: "What day was yesterday?", "How old is a 2-year old baby?", "What color is red?", "Is ice cream hot or cold?", etc.

vi) Awareness. Users are asked questions about the real world, e.g., "What day (month, year) is it?"

vii) Click on a Designated Object/Space. Users are asked to select a particular image, e.g., "Click on the yellow triangle." (See e.g., FIG. 17.) viii) Personal Questions. Based on the users profile, ask simple questions such as "What is your gender?" and select from a graphical list of words, among which will be "male" and "female".

Figure 5:
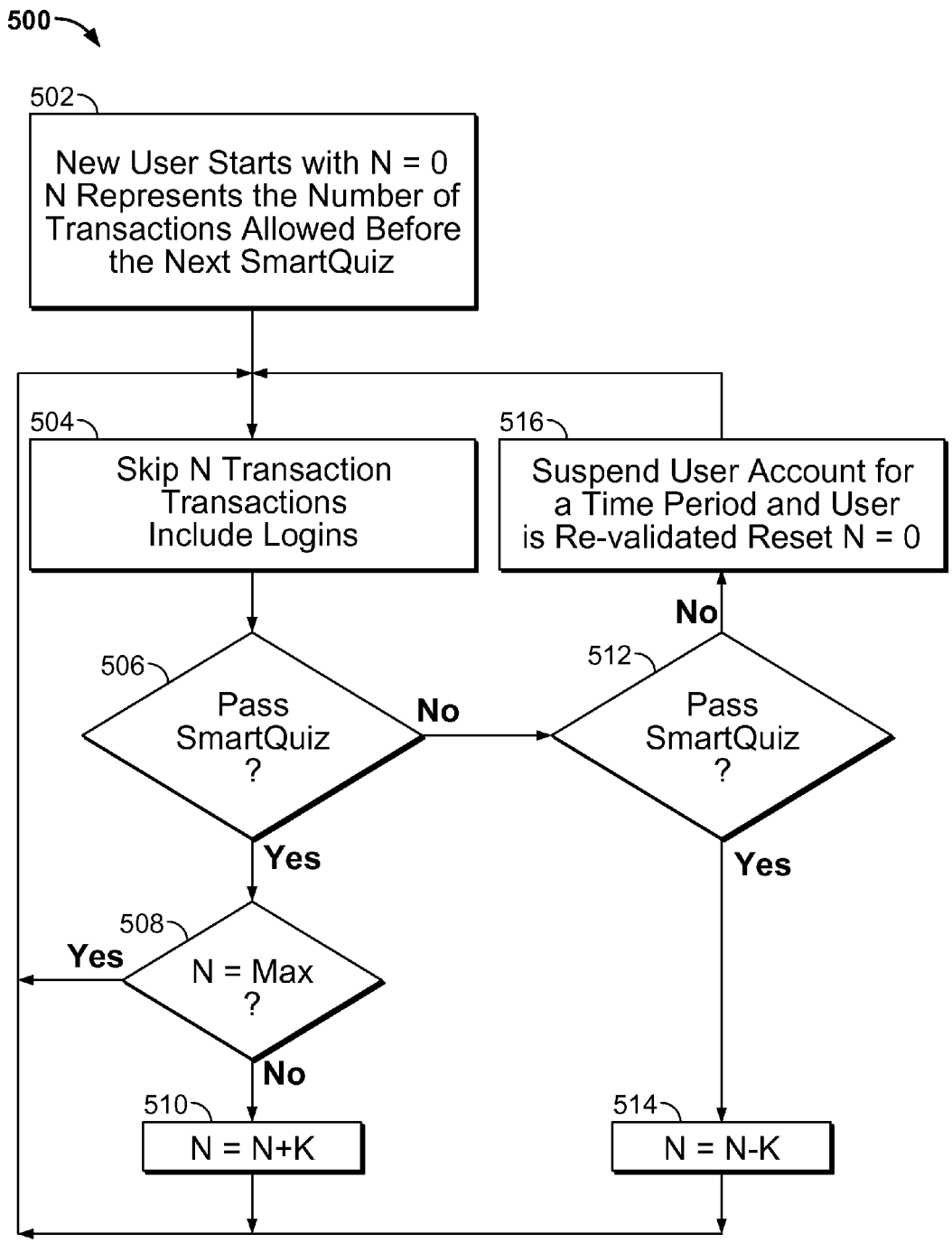
FIG. 5 illustrates a process for determining how frequently a user should be quizzed in accordance with an embodiment of the present invention.

Users may be quizzed with reduced frequency as they respond accurately and with increasing frequency as they fail to respond accurately. For example, FIG. 5 illustrates a process 500 wherein a new user starts (step 502) and is presented with SmartQuizzes at various intervals (step 504). As each quiz is taken (step 506) a determination is made as to whether the user passed the test. If so (step 508), the interval is adjusted (step 510) until a maximum interval is reached. If the user fails a test, a retest might be offered (step 512). Passing the retest also resets the testing interval (step 514). Failing the retest (step 516) suspends the user's account for a designated time interval or causes some other penalty.

6. Search Engine

Figure 10:
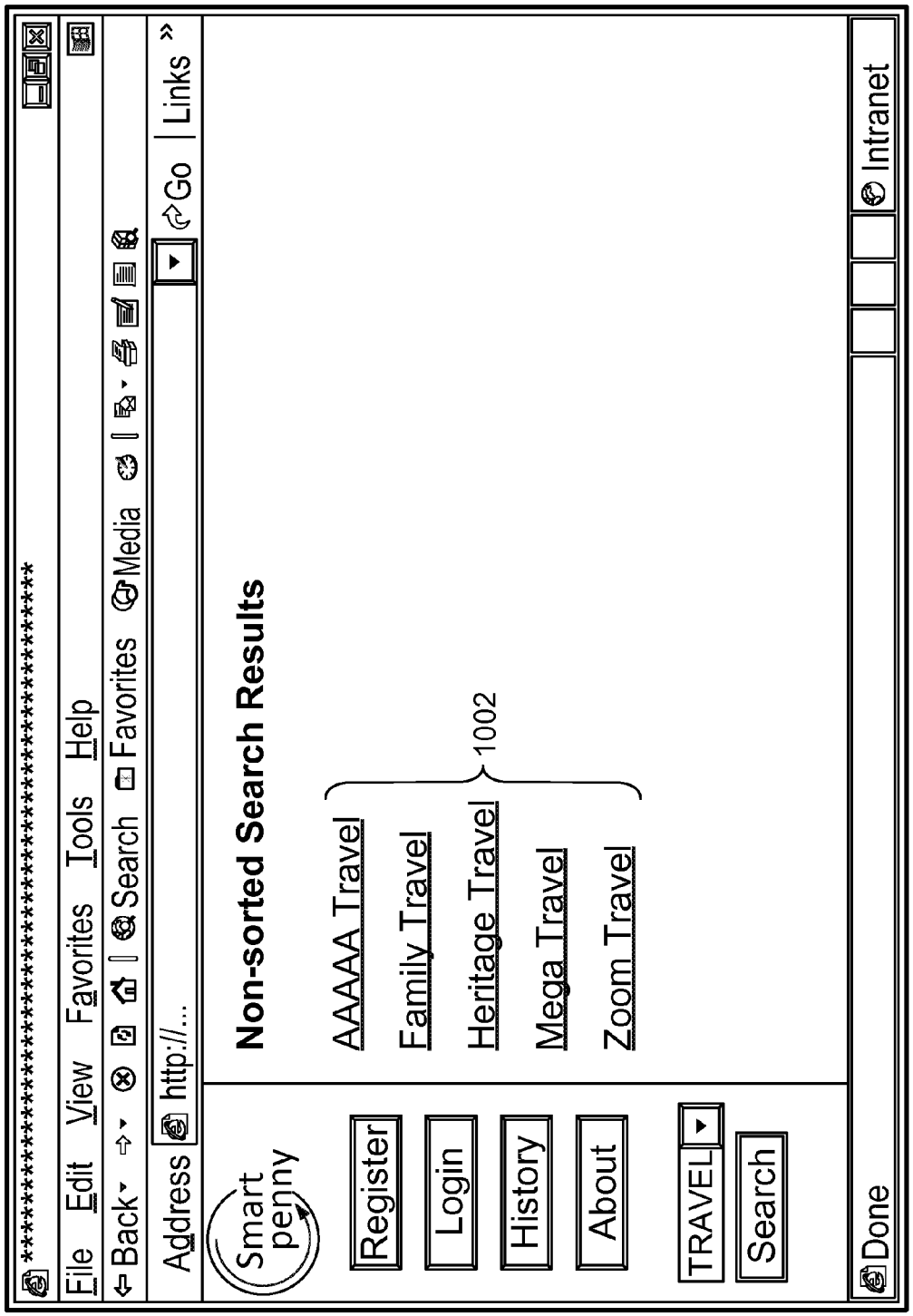
FIG. 10 illustrates a search result that might be returned after a conventional (i.e., non-demographically sorted) search for travel sites.
Figure 11:
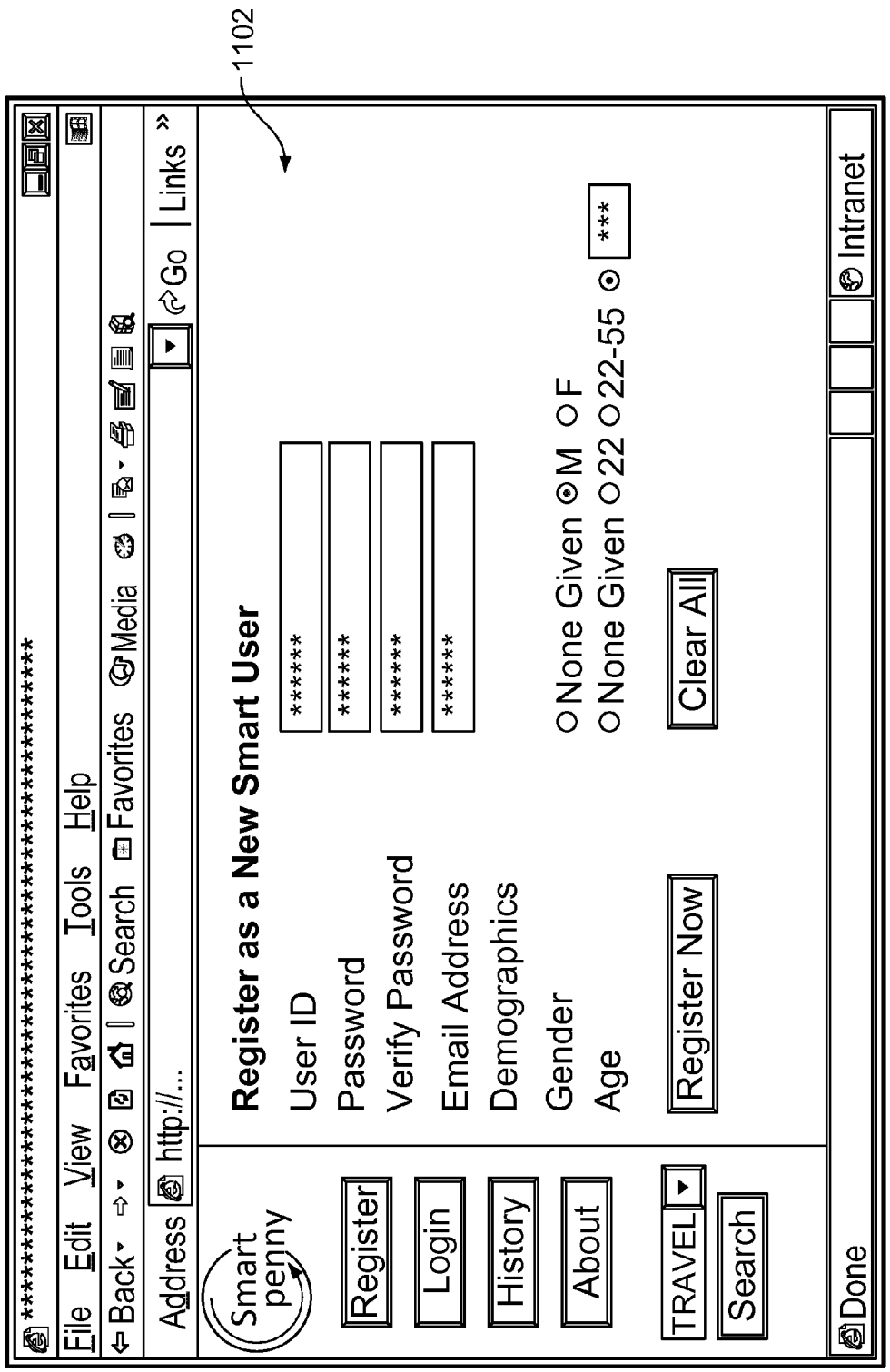
FIG. 11 illustrates an example of a registration sign-in screen in accordance with an embodiment of the present invention.
Figure 12:
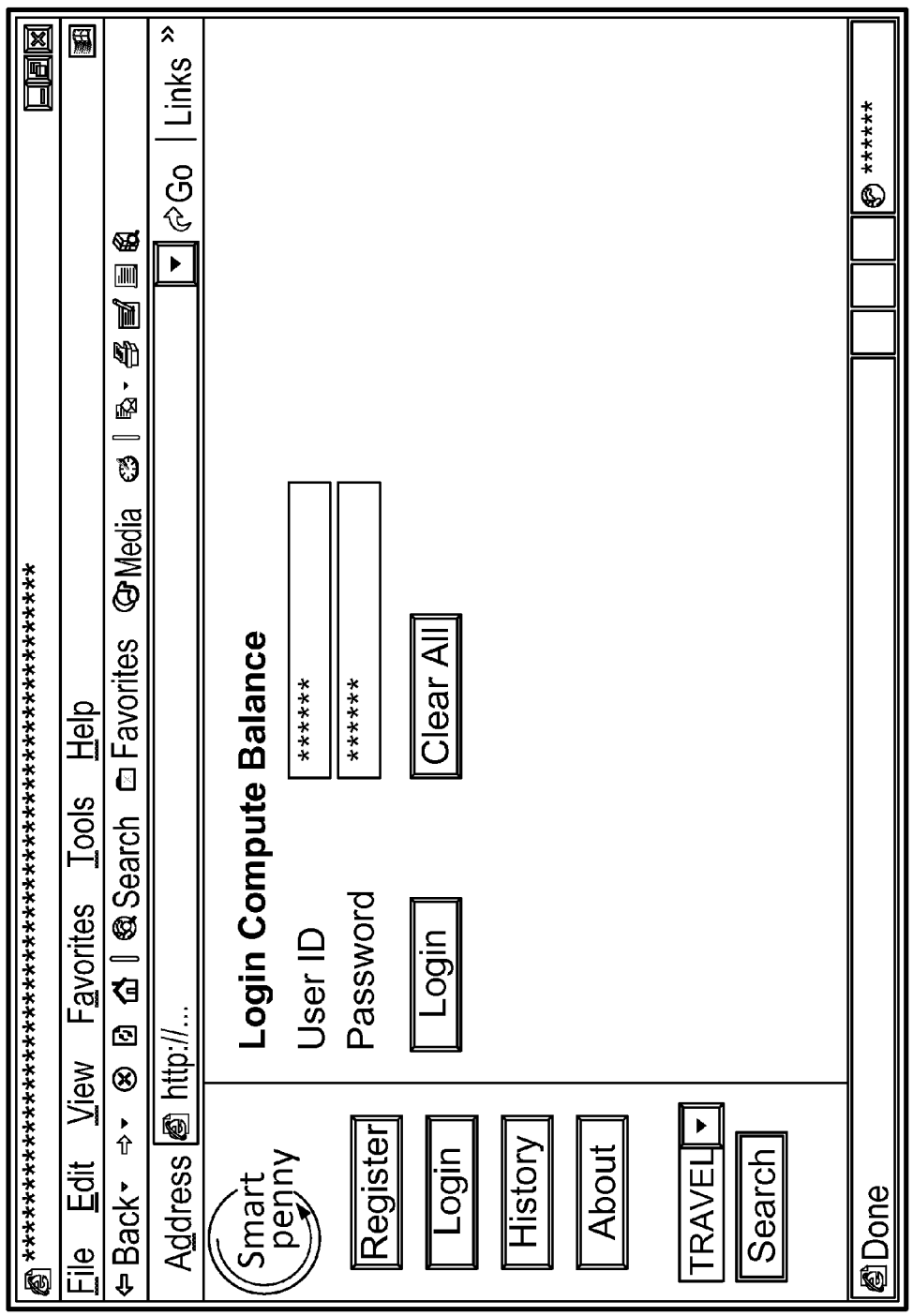
FIG. 12 illustrates an example of a user's account balance screen in accordance with an embodiment of the present invention.
Figure 13:
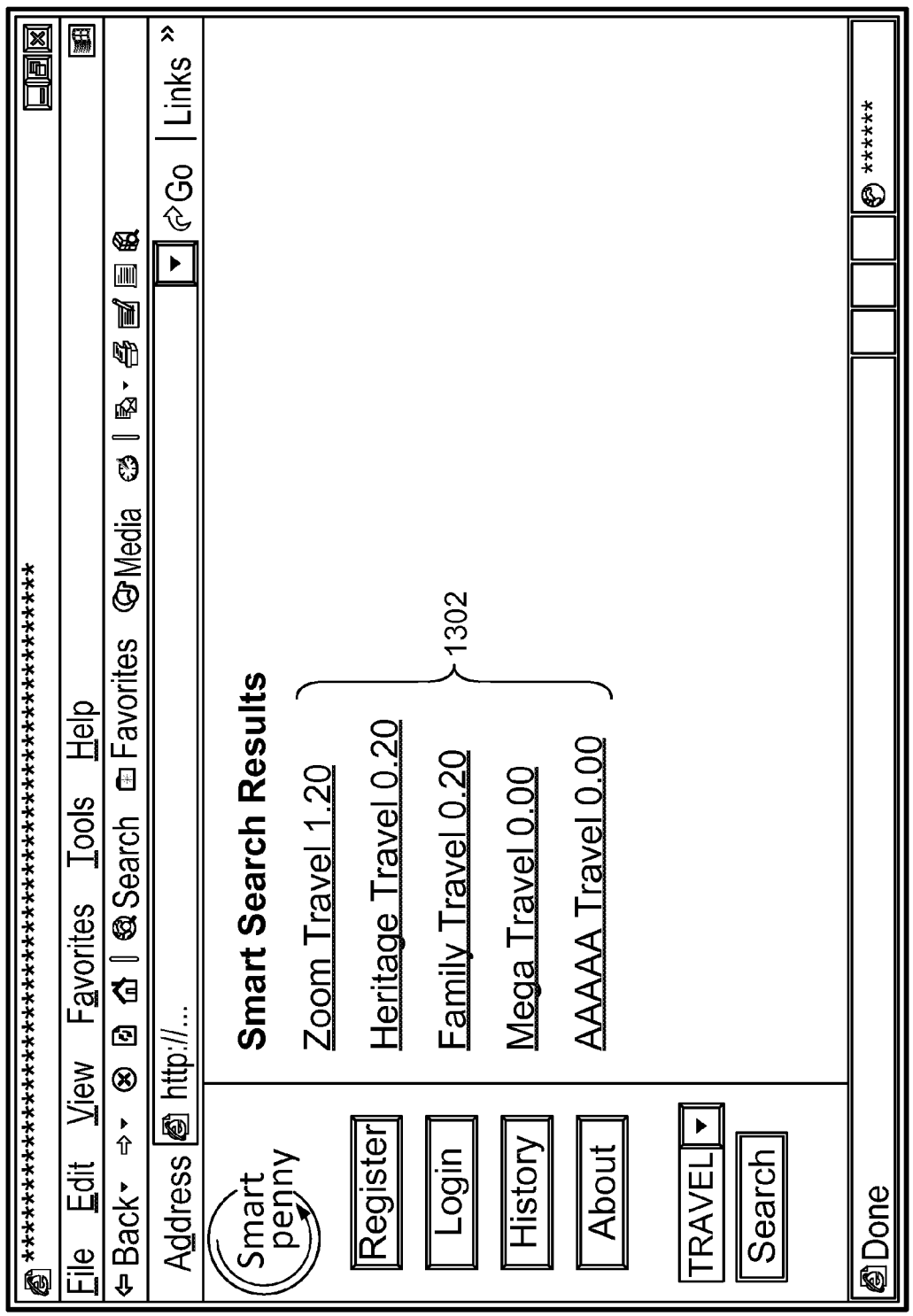
FIG. 13 illustrates an example of a search result returned using the user's demographic profile information in accordance with an embodiment of the present invention.

Some embodiments of the present invention include a search engine that allows a user to search for merchant sites, links, ads and content relevant to their interests. Search results can be sorted according to relevance, reward value, popularity, and/or other criteria. The following describes the search process:

1) A user selects the search engine from a web site configured in accordance with an embodiment of the present invention and enters or selects the search keyword(s).

a) If the user is not logged in, he/she will be directed to the login/sign up pages, but guests may still be permitted to use the system without logging in (and without receiving the rewards offered to registered users).

b) If a user is not logged in, he/she will be able to perform searches, but without the benefit of receiving the rewards (e.g., for the release of demographic profile information) and without receiving search results having a corresponding sorting. See, e.g., FIG. 10, which illustrates a search result 1002 that might be returned after a conventional (i.e., non-demographically sorted) search for travel sites.

c) Once registered (see, e.g., FIG. 11, which shows an example of a registration sign-in screen 1102) and logged in, the user's username and/or account balance and/or demographic profile will appear either in a constant position of the window or by selecting a button or other element to provide the information in a pop up window (see, e.g., FIG. 12 which illustrates an example of a user's account balance screen).

d) The user enters (e.g., via a text box) or selects the desired information/category to search for.

e) The user is returned a list of links relevant to the user's search criteria (see FIG. 13, which illustrates an example of a search result 1302 returned using the user's demographic profile information). Sites offering the highest reward value will be listed first in the search results (rather than say a raking determined according to, for example, the number of times a certain keyword is used as a metatag, etc.), such rewards indicating the content provider's or advertiser's heightened interest in the user's demographic profile. This matchmaker function merges information about both parties, making a more efficient match for both, allowing destination sites to only pay large rewards to targeted (i.e., desired) users and allowing users to easily identify sites which desire them (as well as those which do not). For example, in FIG. 13, Zoom travel, which targets young males, appears at the top of the list rather than the bottom, which would be the tyranny of a mere alphabetical listing. AAAAA Travel, on the other hand, does not cater to young males and correspondingly appears with no reward; whereas a purely alphabetical listing would have placed it at the top of the list, presenting a poor search result for a for a young male user.

f) A site may also choose to represent its URL link as an expanded text link or a graphical banner, perhaps for a fee, when certain search-user demographic criteria are met.

g) Search results may present the destination site names, descriptions, URLs, offered rewards, amounts bid, quality scores, popularity, relevance scores, or other data to assist the user in making his/her selection.

h) The list of relevant sites can be sorted by:
  i) Search relevance.
  ii) Popularity (number of hits to that site).
  iii) Reward potential to that specific user, e.g., John Doe may get $0.10 for visiting a particular site because of his gender, while Jane Doe might only get $0.05 for visiting the same site.
  iv) Amount bid for the position in the returned list by the merchant.
  v) Merchant quality score.
  vi) Search results may be displayed as simple links, text descriptions or graphics.
  vii) Users may also be given the following options for displaying the search results:
    (1) Listing only the top "n" items offering a reward.
    (2) Listing only items offering reward above a certain threshold.
    (3) Listing only items offering a reward.
    (4) Listing only reward items and top "n" non-rewarding items per search score or popularity.
    (5) Listing all matching entries, including items with no reward.

i) The user can set a default sort order for future searches.

j) An advertiser may sponsor the use of the search engine and give users a reward for each search done with the sponsorship ad posted, up to a maximum cumulative reward set by the advertiser for a given time window. Sponsors may also choose how often the same user will be rewarded for repeated interaction.

7. User Rewards

Users earn rewards for desired activities. For example, users may be rewarded for registering with the present service, providing referrals, contributing demographic attributes, performing searches, and/or clicking through on hyperlinks. Once earned, user rewards can be exercised in several different ways such as being exchanged for cash mailed by check, electronically credited to an account, online or physical gift certificates, frequent flyer miles, charitable contributions, contest entries, etc.

8. Trading Post

Once a user has accumulated earnings in his/her account, the earnings can be exchanged using one or more redemption options. For example, a user can allocate $30 of earnings into $10 of online gift certificates, $5 of contest entries and a $15 check. A user can also choose that earnings be automatically allocated. For example, for every $20 a user may direct $5 to that week's contest, and $15 to a cash check.

9. Sweepstakes

Some embodiments of the present invention may include a progressive jackpot sweepstakes. For every certain activity engaged in by users and proportional to the number of entries in the contest, an amount of cash is placed in a progressive jackpot, the amount to be visible to all users.

A winner will be selected from among the entries and announced at a particular day/time interval to encourage users to log on at that specified time interval. The winner will be notified when he/she logs on. If the winner does not log on or claim the prize within a predetermined time interval of the announcement, a backup winner will be announced, encouraging users to log on a second time, and so on. Any prize award may be deposited into the user's account balance and can be allocated at the trading post.

10. Reading Ads

Figure 6:
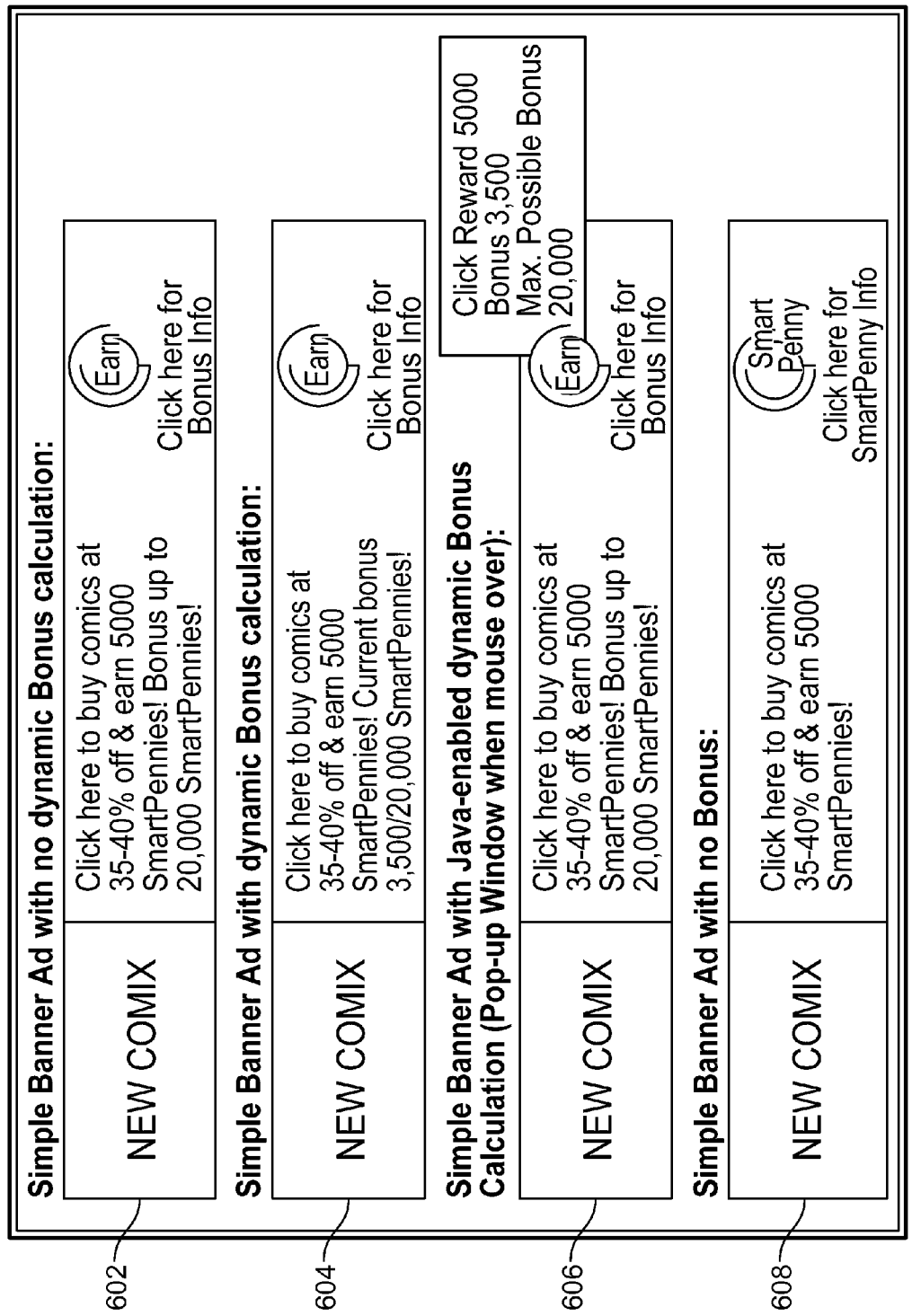
FIG. 6 illustrates various manners in which bonus information can be displayed with banner ads in accordance with embodiments of the present invention.

Ads may be displayed within a user's personal reward window as shown in FIG. 6. As shown, when rendered as a conventional banner ad 602, no bonus/reward information is displayed. Under the present scheme, however, banner ads may be rendered with the associated bonus calculation displayed 604, with additional information in a pop-up window 606, or without any information regarding bonuses 608. Other ad formats can also be used, e.g., splash screen ads, etc. When a user selects an ad, his/her account is credited with the corresponding reward. Limits can be set on rewards per user, or per ad, to discourage abuse.

If desired, some embodiments of the present invention can include a pop-up window that appears when the user positions her/his cursor over a portion of the ad. Using Java™, JavaScript and/or other scripting languages, the correct bonus and maximum bonus available may be displayed as a result of such cursor action. These bonuses reflect the available reward for providing the demographic and profile information entered by a user.

1) Ads hosted on web sites including embodiments of the present invention.
  a) If a user is not yet signed up or logged on, he/she may be presented with a sign up or log-on page.
  b) The user searches through the sorted search engine results and views the resulting ads and links. Next to each ad or link may be displayed the associated basic reward, the actual bonus reward, and the total potential bonus reward (see, e.g., FIG. 6).

c) The user might not be shown ads for which the reward is zero due to either an expired time window or repeat usage restriction.

d) When a user selects a link or banner ad enabled according to the present invention:
   i) The user is directed to the designated destination site.
   ii) The user's account is credited with the available reward.
   iii) The destination host's account is debited the amount of the user reward and the amount of the transaction commission (if any).

2) Ads and links hosted remotely.

a) Ads and links enabled by embodiments of the present invention can be posted on any web site.

b) Enabled ads or links may either appear as conventional, non-enabled ads or as conventional links to non-users (i.e., individuals that are not registered users of a service configured in accordance with the present invention). Users (i.e., those that are registered) should always be presented with the enabled version of such ads or links. For example (and referring to FIG. 1), advertiser 106a could host its own ads rather than storing them on the host 104. As such, the advertiser 106a might provide both enabled and non-enabled versions of these ads. Users of the host 104 who have logged in will automatically be shown the enabled ad.

c) This mechanism can also be used on web sites such as those of content providers 108a-c to encourage deeper interaction by visitors.

For example, a user can be rewarded to take a survey, provide feedback or register for a product sample.

11. Consuming Content

Enabled content may be displayed with an access price. Selecting a link associated with the content will cause the content to be delivered to the user or cause the user to be direct to a web site at which the content is available and credit/debit her/his account accordingly. The user may access such content from links returned by the search engine provided by some embodiments of the present invention or from the content provider's site, etc. The price of the content may be listed next to the link (see, e.g., FIG. 7). As shown, content prices may be displayed as part of a web page 702 or in association with banner ads and the like 704. Content providers may also bundle rewards for users to encourage their target customers to visit the content site. For example, different prices for the content may be set for in state vs. out-of-state residents, etc.

When a user clicks on a for-fee content link.

a) Verification is performed to ensure that the user has sufficient credits in his/her account.
   i) If there is not a sufficient balance in the user's account, the user is advised of this fact and can be directed to an ad farm (e.g., a site at which a user can view multiple advertisements) to earn additional credit.

b) If sufficient credit is available, the user is directed to the content site.

c) The user's account is debited the content price.

d) The content provider's account is credited the content price less a transaction commission if appropriate.

e) In some embodiments, it is up to the content provider to define and set up the access control mechanism for their content. These content providers can define how often a user can access content that is paid for. For example, a cookie may be placed on the user's computer or web-access device recording that they have paid for access to the content site. Content providers can allow repeated access for a specified period of time and customize their site for paying return visitors.

12. Bonus and Research

Each ad, link or search result can calculate a bonus for a specific user based on that user's demographic profile and the ad's or link's desired target. In addition to simply qualifying users as members of a demographic group, advertisers can thus pay users in exchange for their specific profile information to do research.

In such a scheme, next to each ad, link or search result, the base reward may be listed along with the potential bonus and the actual bonus. The base reward is what is given to any unqualified visitor. The potential bonus reward is the total reward possible if a user meets all of an advertiser's demographic target criteria. The actual bonus is the reward that a user will receive based on their actual demographic profile. For example, out of a potential bonus of $1.00, a user may receive $0.50 because that user lives in San Jose (a desired demographic area for the advertiser), but not the additional $0.50 because the user is not male (the desired gender demographic of this advertiser).

By selecting a link associated with the potential bonus, the user can see the association between demographic information and rewards for a specific ad. If the user has not provided all of the desired demographic information, he/she may return to his profile and add the desired information in order to receive the additional bonus. For example, a particular user might not have originally submitted gender information with the user's profile, but over time the user might notice that ads give a higher reward for gender information. The user might thereafter add her/his gender information to her/his profile and from then on is entitled to receive the gender "bonus" when her/his gender fits the desired demographic profile for an ad/link, etc.

Demographic information can be held within a secure server and not transmitted across the network 102. Advertisers may, or may not be provided with a user's demographic profile immediately, and may only receive information indicating that the user satisfied the bonus criteria and qualified. When the user views a bonus ad the user's demographic information is compared to the ad bonus criteria and the bonus is calculated either at the host or at the user's client. When the user selects a bonus ad:
   i) The user is sent to the destination site.
   ii) The user's account is credited with the base and bonus award.
   iii) The advertiser's account is debited the same amount, plus a transaction commission if appropriate.

If an advertiser and/or researcher wants to collect actual demographic information on users (in addition to demographic qualification), and the user agrees, actual profile information requested, and approved by the user, can be stored in the advertiser's reports for later access. See also FIG. 3 for an example of a user profile matrix 300 that may be displayed to a user and which shows available reward points and configuration options associated with various user profile information.

C. Advertiser Registration

Advertisers can provide ads by creating an account with the host 104. An advertiser might typically provide a destination URL, a banner link, a demographic target, a reward structure (e.g., indicating the reward to be paid for specified demographic information, the portion of same to be passed on to the user, etc.), a working balance, and/or other information. The following process is an example of how the advertiser may create such an account:

1) Advertiser Selects Signup on Host.
   a) Advertisers can open an account by providing a banner image link, site description, a destination location, a desired reward rate and contact information. The ad can be activated when the advertiser deposits money (or an equivalent thereof, e.g., credit information) in their account to pay users. When an advertiser's account balance reaches zero, the ad can be withheld from display to users, or the ad may be displayed with no reward being offered to the users.
   b) Base rewards for non-qualified users can be set.
   c) A reward matrix 1802 listing one or more desired attributes can be completed (see, e.g., FIGS. 18A and 18B) for keywords, demographic attributes, if the user is a known customer of that merchant, and the amount of the bid to be passed through to the user as a reward.
   d) Bonus rewards may be set up by the advertiser using bonus criteria, involving their desired reward for each piece of profile information (see, e.g., FIG. 2, which illustrates a user configuration matrix 200, e.g., a screen display that can be presented to the user, to be completed during the registration process and allows for attributes such as user name, age, gender, data of birth, zip code and/or household income to be specified and designated as being available for submission to advertisers, etc. automatically or not). Merchants and advertisers can choose the amount of reward to pass-through to the user.
   e) Advertisers may set the reward for targeted users by completing an n-dimensional full factorial demographic reward matrix (see, e.g., FIG. 15, which shows an example of a reward matrix 1502).
   f) Time caps may be set by the advertiser for the desired time which must elapse before a specific user can earn rewards from the same ad or link again.
   g) A number of allowed repeat visits by a user can be set.
   h) An advertiser can set a cumulative reward cap per timeframe, e.g. $1,000 per 24 hours.
   i) An advertiser can set a cumulative reward cap per user, e.g. $20 per user per lifetime of ad.
   j) Rewards for repeat visitors can be set by an advertiser to stay the same, decrease or increase, e.g., $0.10 for a first visit, $0.05 for a second and subsequent visit, etc.
   k) Rewards can be varied over time. For example, an advertiser may offer a higher reward during lunchtime than in the late evening. Or, the advertiser may reduce the reward as his/her credit balance runs low to increase the length of time of the advertising campaign. Or, the advertiser may increase the available reward if an ad is not attracting enough attention from users.
   l) Keywords for ads (e.g., to be used by the search engine) can be set by an advertiser.
   m) Each ad may be assigned an identifier for reference.
   n) Advertisers can monitor ad activity over the network 102. Reports may be generated with a timestamp for transactions, amount awarded, commissions, total debit, and resulting account balances.
   o) Advertisers can use network-based tools for evaluating campaign activity with respect to demographics, activity over time, responses to reward changes and demographic targeting and data collection.
   p) Credit can be added to an ad account at any time. When a campaign is completed, all unused account balances can be returned to the advertiser.

D. Content Provider Registration

Content providers can begin earning money on their site by creating an account online, e.g., by providing the site URL, price, and type of charge (e.g., up front or gratuity). The content provider may then insert a single line of HTML code to enable the earning process. This procedure may, in one example, be described as follows:

Initially, a content provider will register or sign up at host 104 with the service provider offering the present scheme. Content providers can create a content account at host 104 by providing their content price, content link and choosing a means of account transfer and contact information. Available content fee collection methods include collection of upfront fees or collection of gratuities. With upfront fees, the payments are fixed. That is, a user wishing to access the content must pay the set fee to be granted such access. A gratuity collection process allows users to pay voluntarily, without obstructing access to the content. Payment options for such tips can be customized as open, default suggested, check box selection, radio button selection, slide bar selection or fixed value options. This allows for great flexibility in incorporating the tip-payment feature into the content provider's web site.

Each content site URL can be assigned an identifier. Furthermore, the content provider can provide keywords (to be used by the search engine) for each content site. Once a content provider has registered, host 104 may transmit a URL to the content provider for use as a content fee or tip link and any appropriate HTML, JavaScript or other code to embed in the relevant web site to enable such operation.

Content providers can monitor their account activity over the network 102. Reports can be generated with a timestamp for each transaction, the amount charged, and any commissions paid out/generated, net credit, and resulting account balances. These account balances can be transferred to any ordinary account such as a bank account or credit card account, or cash can be paid out as a check. Alternatively, the balance can be credited to a user account. The operator of host 104 may charge service fees for these services.

E. Merchant (Advertiser and Content Provider) Quality Control

Merchants will preferably be validated on inspection before their account is activated. In addition, members of the user community may be invited to contribute their own evaluations of merchant quality on an ongoing basis. To ensure the quality of user reviews, such a process may be by invitation only. Alternatively, or in addition, users may periodically, at random or at an interval to be determined by a mathematical or statistical algorithm, be invited to review sites that they have actually visited through the system and offered a reward for completing the review. Users may thus be presented with a short list of web sites that they have recently visited through the search engine and asked to provide feedback in exchange for a reward. The reward may be any combination of credits, cash, sweepstakes entries or any other form of remuneration acceptable to the user. The results of these reviews by the user community may then be summarized into a numerical score, also known as the merchant quality score. The higher the merchant quality score, the better the merchant's rating. This quality score may be displayed with search results to give users a better idea of the popularity or level of satisfaction for a particular merchant web site.

F. Tipping

Figure 8A:
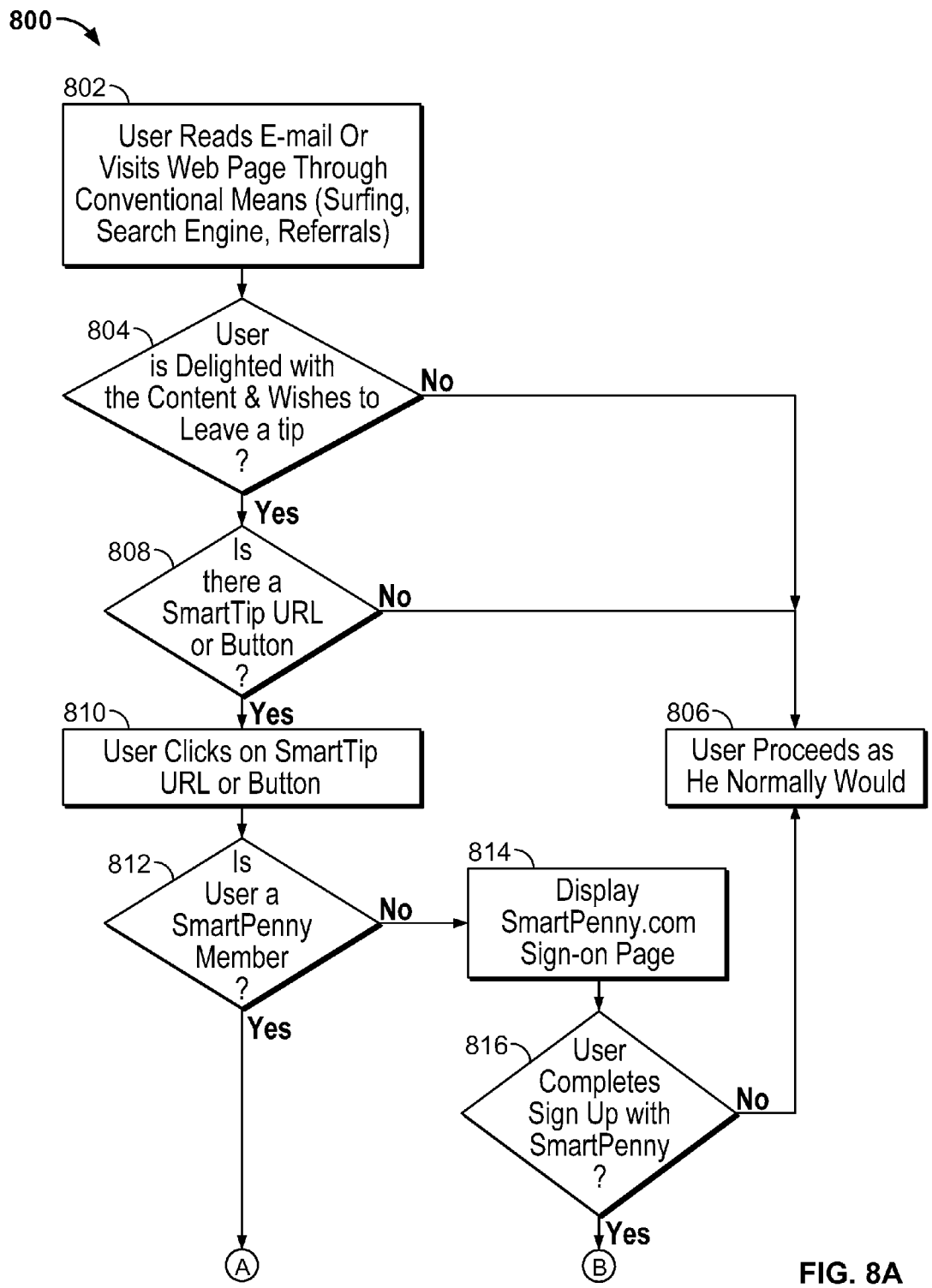
FIGS. 8A and 8B illustrate a process by which users may leave gratuities for content provides in accordance with an embodiment of the present invention.
Figure 8B:
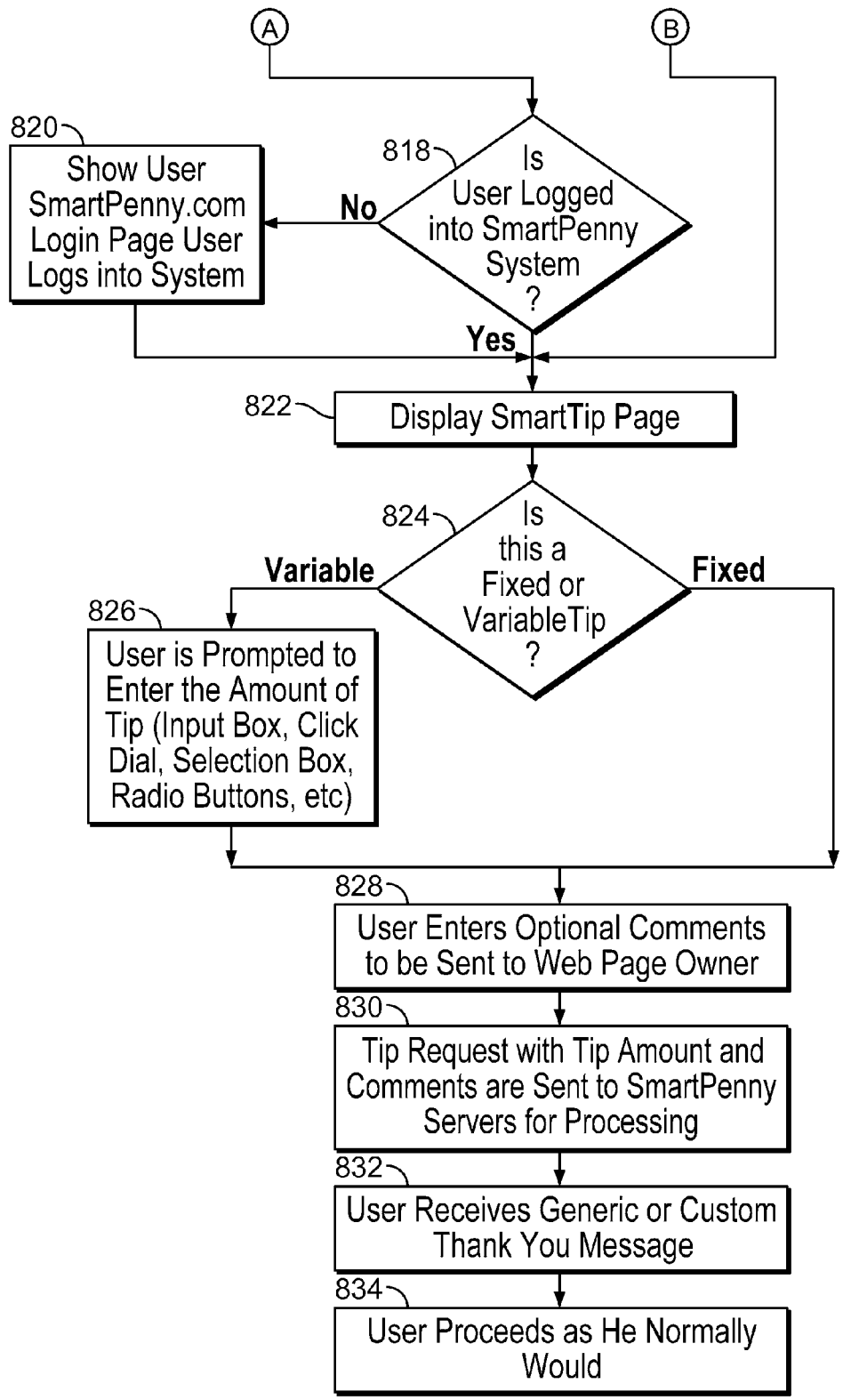

Content providers can enable tipping to collect voluntary fees or donations from users. After providing the tip, the user can be sent to a thank you page. FIGS. 8A-8B illustrate aspects of the tipping process in detail. Web page-based tipping provides a means for voluntary payments, which can be used when a content provider wants to collect fees without erecting entry barriers for users. In such a scheme, a user views content including a tip icon, a tip form, tip link, or some other means to be directed to a payment site, etc. To then provide a tip, the user simply selects the icon, link, etc. and designates the appropriate gratuity at the site to which he/she is then directed. If a user is not yet signed up or logged on, he/she may be presented with a sign up or log-on page.

In accordance with the process shown in the diagrams, a process 800 begins with the user receiving an invitation to visit a content site (step 802), for example via e-mail or while web surfing. After visiting the site the user may decide whether he/she enjoyed the visit (step 804). If not, the user continues surfing in the conventional fashion (step 806). However, if the user did enjoy the visit to the web site and wants to express his/her appreciation to the content provider, the user can select a link to a gratuity site if one is provided (steps 808 and 810). At the gratuity site (or perhaps en route thereto), a determination may be made as to whether the user is a registered user of the present service (step 812). If not, the user is offered the opportunity to register (step 814) and the user may accept or decline the invitation (step 816). If he/she declines, the user continues surfing in the conventional fashion.

In the case where a user is already a registered user a determination is made as to whether the user is presently logged on to the system (step 818). If not, the user is asked to sign in (step 820). Ultimately, the user is directed to the site at which he/she can leave a gratuity (step 822). While at the site, different procedures may be followed depending on whether the site is a set gratuity or variable gratuity site (step 824). For variable gratuity sites, the user is provided with the opportunity to indicate the amount of the tip to be provided (step 826). In either case, the user enters the tip amount and may then provide comments (step 828) to be provided to the content site provider. The tip authorization and the comments may be provided to the host 104 (step 830). In return, a "thank You" or similar message may be provided to the user (step 832) and the user may continue surfing (step 834).

At the payment site, a pop up window or other display feature (e.g., a separate web site) may present the user with one or more possible tip options (suggested amount, blank window, selectable amount options, slide bar amount, radio button selected amount, or default amount options, etc.). FIG. 9 illustrates some of these options, such as a radio button 902 which may be selected to direct the user to a site where he/she might leave a gratuity and text boxes 904 and 906 where the user may enter a tip amount and any comments on the content or experience provided by the web site. The pop up window may also provide the user with a text box to submit comments on the content.

When a user indicates a tip should be paid, host 104 may verify that the user has sufficient balance in his/her account for the tip amount submitted. If there is not sufficient balance in the user's account, the user may be advised of his/her balance with a link to view ads (e.g., to earn more reward points) and thereafter return to the tip window to leave the tip.

Once tipping is complete, the user can be automatically directed to the content provider's "Thank You" page, another selected page, and/or a generic "Thank You" message can be displayed. At host 104, the user's account is debited the tip amount and the content provider's account is credited the tip amount less a transaction commission, if appropriate. A cookie may be placed on the user's web browser recording that they have paid for access to the content site. Content providers can thus customize their sites for paying return visitors. For example, return customers who have left tips in the past might get a special welcoming message and/or receive a special reward on a return visit.

An alternative process uses so-called "Email Tips". In this scheme, a tip URL can be transmitted in a text e-mail. Then, when the user selects on the URL, the tip functions the same as a web based tip.

G. Limiting Spam Through Quizzes

The quizzes described above can also be used in other environments. For example, a quiz can be embedded in a mail transport agent (MTA) or mail user agent (MUA) to verify that senders are human to assist in filtering undesired or "spam" e-mails. The following process can be used:

a) If email is received from an unknown sender, e.g., by checking against a list of known senders, the MTA and/or the MUA may transmit a URL to site that includes a quiz, or include a quiz in a return e-mail to the unknown sender. This e-mail might notify the sender that his/her original e-mail will not be opened or otherwise processed until the recipient thereof receives some confirmation that the sender is a live person and not some automated process. Hence, the e-mail might explain the purpose of the quiz and invite the sender of the original e-mail to "take the quiz".
   i) If the quiz is not answered correctly within a predetermined period, e.g., 24 hours, the original e-mail may be deleted or returned as undeliverable.
b) By verifying that the sender is human, automated (so-called "spam") e-mails can be filtered out. The user can also add the sender of any spam messages to a list of known "spammers" so that future quizzes can be avoided. Similarly, the user can add any mailing lists they participate in to a list that permits mails from that list to pass through to the user's in-box.

The quizzes can be provided at a host, e.g., the host 104, for free or for a small fee, e.g., $0.03 per quiz provided to unknown sender. Such fees can be automatically deleted from the user's accounts. Further, the spam control feature can be offered completely separate and apart from the micro payment system, e.g., $10.00 (or some other flat fee) for a year's worth of spam filtering using quizzes. Alternatively, the quizzing system can be integrated with the MTA and/or MUA on the user's personal computer. For example, the "sendmail" process, a common MTA known in the art, could be programmed to check a sender against a user's known list. If the sender is absent from the known list, the sendmail process could queue the mail for delivery pending a response to an e-mailed picture containing a quiz generated by the MTA.

H. Technical Methods

Figure 16:
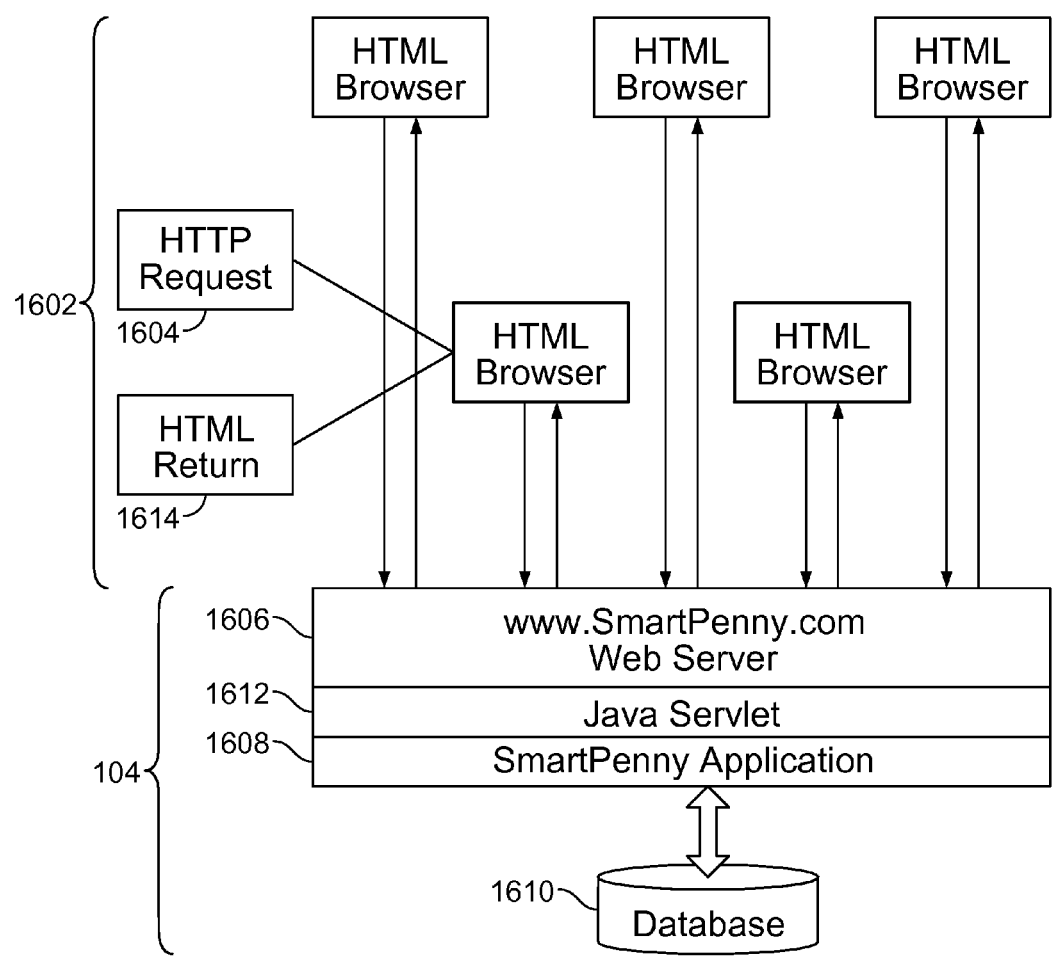
FIG. 16 illustrates an example of various software and/or hardware layers of one or more computer systems that may be utilized in providing the services of the present invention.

The present system (see FIG. 16) is designed to solve several technical problems and includes a standard user interface 1602 that may make use of a conventional web browser, facilities to allow for minimized transactions costs, the ability to serve many users concurrently and secure information transfer without high overhead costs. The interface to the user is conventional HTML and JavaScript, allowing users of the system to rely on conventional web browsers for access and operation.

All functions on the present system begin with the user entering information into a conventional HTML form and submitting a conventional HTTP request 1604 to the web host 104. The HTTP request may contain a call to the web server application 1606, which facilitates communication between the HTML interface 1602, application business rules 1608 and any back-end database server 1610. Because the request is to an overlying application 1608 rather than to a database 1610 directly, system efficiency and scalability are enhanced. The application 1608 can securely hold the database connections open, greatly reducing the overhead on the server 1606 for each database query (alternative solutions require a database open/close for each query).

The application program 1608 (which may or may not be accessed through a middle layer Java Servlet 1612) discussed above may use programmed business rules to determine what queries need to be sent to which databases 1610 and may make database calls in a single block. This low-overhead process coupled with the ability to run multiple copies of the application program 1608 on the web server 1606 allow for many concurrent users. A multithreaded web server 1606 may balance requests to each copy of the application program 1608. The application program 1608 and database schema may be designed such that information about accounts, reward calculations, etc. are stored in the database 1610 and verified from the database 1610. Unauthorized users and automated web bots thus cannot simply make up a URL and send it in to increase their account balances. Once the application program 1608 processes a command, it builds and returns 1614 feedback to the users in HTML to the user's browser.

Although the foregoing description and accompanying figures discuss and illustrate specific embodiments, it should be appreciated that the present invention is to be measured only in terms of the claims that follow.

What is claimed is:

1. A method, comprising:
    transmitting, by a first computer system, a prompt to a second different computer system for display on a web page, the prompt including one or more graphical images and a corresponding question related to the one or more graphical images, and a means for a human operator of a computer system to provide, when interacting with the web page, a respective answer thereto;
    receiving, at the first computer system, a response related to the prompt;
    determining, by the first computer system, whether the received response includes a correct answer;
    when the received response includes a correct answer, determining that the respective response was not provided by an automated entity but was instead provided by the human operator of the second computer system and granting the human operator access to a computer-based resource; otherwise, denying access to the computer-based resource;
    determining an amount of time or amount of resources that will be accessible by the human operator before a next prompt is transmitted including adjusting an interval for a next prompt including increasing an amount of time or resources associated with the interval from a baseline amount to an increased amount when the respective response is inferred to have been provided by the human operator and based on correctness or incorrectness of the responses to prior prompts; and
    providing a second prompt after expiration of the interval.

2. The method of claim 1 wherein the computer-based resource comprises a resource adapted for sending an e-mail message.

3. The method of claim 1 wherein the computer-based resource comprises a Web site.

4. The method of claim 1 further including providing data from the computer-based resource in ranked order according to a demographic profile of a respondent.

5. The method of claim 4 wherein the data comprises one or more of: advertising information or search results to search queries posed by a respondent.

6. The method of claim 5 wherein the data is returned in a ranked order according to reward credit portions offered by advertisers associated with the advertising information.

7. The method of claim 6 wherein the reward credit portions are posted to a user account maintained by the respondent upon selection by the respondent of selectable objects associated with the advertising information.

8. The method of claim 5 wherein the data is returned in the ranked order and wherein the ranked order is influenced by reward credit portions offered by content providers associated with the advertising information.

9. The method of claim 5 wherein the data is returned in the ranked order and wherein the ranked order is influenced by reward credit portions offered by advertisers associated with web sites represented by the search results.

10. The method of claim 5 wherein the information is returned in the ranked that is influenced by reward credit portions offered by content providers associated with web sites represented by the search results.

\* \* \* \* \*